US011955070B2

(12) United States Patent
Lin et al.

(10) Patent No.: US 11,955,070 B2
(45) Date of Patent: Apr. 9, 2024

(54) EMISSION CONTROL METHOD FOR DRIVER CIRCUIT OF DISPLAY PANEL

(71) Applicant: NOVATEK Microelectronics Corp., Hsin-Chu (TW)

(72) Inventors: Kun-Zheng Lin, Hsinchu (TW); Chang-Hung Chen, Hsinchu County (TW); Wei-Chieh Lin, Hsinchu County (TW); Po-Sheng Liao, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/533,043

(22) Filed: Nov. 22, 2021

(65) Prior Publication Data

US 2022/0366844 A1 Nov. 17, 2022

Related U.S. Application Data

(60) Provisional application No. 63/187,421, filed on May 12, 2021.

(51) Int. Cl.
*G09G 3/3225* (2016.01)
*G09G 3/3266* (2016.01)
*G09G 3/3275* (2016.01)

(52) U.S. Cl.
CPC ..... *G09G 3/3225* (2013.01); *G09G 2330/021* (2013.01)

(58) Field of Classification Search
CPC ... G09G 3/3291; G09G 3/3283; G09G 3/3275
See application file for complete search history.

(56) References Cited

U.S. PATENT DOCUMENTS

| | | | | |
|---|---|---|---|---|
| 11,222,602 | B2 * | 1/2022 | Kim | G09G 3/3266 |
| 11,373,570 | B2 * | 6/2022 | Hsieh | G09G 3/20 |
| 2015/0287383 | A1 * | 10/2015 | Kim | G09G 3/20 345/204 |
| 2018/0061315 | A1 * | 3/2018 | Kim | G09G 3/3275 |
| 2018/0261163 | A1 * | 9/2018 | Hyun | G09G 3/003 |
| 2018/0286300 | A1 * | 10/2018 | Vahid Far | G11C 19/287 |
| 2018/0322831 | A1 * | 11/2018 | Kim | G09G 3/3266 |
| 2020/0211493 | A1 | 7/2020 | Kim | |
| 2020/0357362 | A1 * | 11/2020 | Shin | G09G 3/035 |
| 2020/0394984 | A1 * | 12/2020 | Park | G09G 3/3266 |
| 2021/0110767 | A1 * | 4/2021 | Wang | G09G 3/3225 |
| 2021/0312854 | A1 * | 10/2021 | Huang | G09G 3/3266 |
| 2021/0375174 | A1 * | 12/2021 | Hsieh | G09G 3/20 |
| 2021/0407424 | A1 * | 12/2021 | Long | G09G 3/2022 |

FOREIGN PATENT DOCUMENTS

| | | | |
|---|---|---|---|
| CN | 104700795 | A | 6/2015 |
| CN | 105609070 | A | 5/2016 |
| CN | 108877634 | A | 11/2018 |
| TW | 200307237 | | 12/2003 |
| TW | 202041929 | A | 11/2020 |

* cited by examiner

*Primary Examiner* — Sepehr Azari
(74) *Attorney, Agent, or Firm* — Winston Hsu

(57) ABSTRACT

A first driver circuit is configured to cooperate with a second driver circuit to control a display panel, wherein the first driver circuit is configured to output display data to a first area of the display panel and the second driver circuit is configured to output display data to a second area of the display panel. A method used for the first driver circuit includes outputting at least one emission control signal to control the second area of the display panel when the second driver circuit is disabled.

15 Claims, 21 Drawing Sheets

EMISSION CONTROL METHOD FOR DRIVER CIRCUIT OF DISPLAY PANEL

CROSS REFERENCE TO RELATED APPLICATIONS

This application claims the benefit of U.S. Provisional Application No. 63/187,421, filed on May 12, 2021, the contents of which are incorporated herein by reference.

BACKGROUND OF THE INVENTION

1. Field of the Invention

The present invention relates to an emission control method for a driver circuit of a display panel, and more particularly, to an emission control method for a driver circuit of an organic light-emitting diode (OLED) panel.

2. Description of the Prior Art

An organic light-emitting diode (OLED) is a light-emitting diode (LED) in which the emissive electroluminescent layer is a film of organic compound, where the organic compound can emit light in response to an electric current. OLEDs are widely used in various display devices such as television screens, computer monitors, outdoor displays, and portable systems such as mobile phones and handheld game consoles. To control an OLED panel to display a video, a driver circuit (e.g., a driver integrated circuit (IC)) is usually implemented to drive the OLED panel to display.

With the trends of large scale and increasing resolution of the panel, an OLED panel is requested to be commonly controlled by multiple driver circuits. Ina conventional OLED display system where the OLED panel is partition controlled by multiple driver circuits, the power voltages for each part of the display panel are provided from a power management IC (PMIC). In other words, the PMIC will supply the power voltages to each part of the display panel. In such a situation, the driver circuits for controlling the same panel should be simultaneously on or off, and it is impossible to disable only one or several driver circuits. Therefore, as for the OLED panel controlled by multiple driver circuits, power consumption can only be saved by reducing the frame rate or reducing the brightness and operation voltage, and the power saving effects of these operations are limited.

However, the prior art cannot save power by disabling only one or several driver circuits for controlling the OLED panel. Thus, there is a need for improvement over the prior art.

SUMMARY OF THE INVENTION

It is therefore an objective of the present invention to provide a novel emission control method for a driver circuit of a display panel, where the emission control is feasible when one or several of the driver circuits are disabled, in order to solve the abovementioned problem.

An embodiment of the present invention discloses a method for a first driver circuit, which is configured to cooperate with a second driver circuit to control a display panel. The first driver circuit is configured to output display data to a first area of the display panel, and the second driver circuit is configured to output display data to a second area of the display panel. The method comprises outputting at least one emission control signal to control the second area of the display panel when the second driver circuit is disabled.

Another embodiment of the present invention discloses a method for a first driver circuit, which is configured to cooperate with a second driver circuit to control a display panel. The method comprises steps of: outputting display data to a first area of the display panel when the first driver circuit is enabled, and outputting black image data to the first area of the display panel when the first driver circuit is disabled.

Another embodiment of the present invention discloses a method for a display system. The display system comprises a display panel commonly controlled by a plurality of driver circuits. The method comprises steps of: controlling a first driver circuit among the plurality of driver circuits to be disabled, and a second driver circuit among the plurality of driver circuits outputting at least one emission control signal to control a first area of the display panel when the first driver circuit is disabled. Wherein, the first area is configured to receive display data from the first driver circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
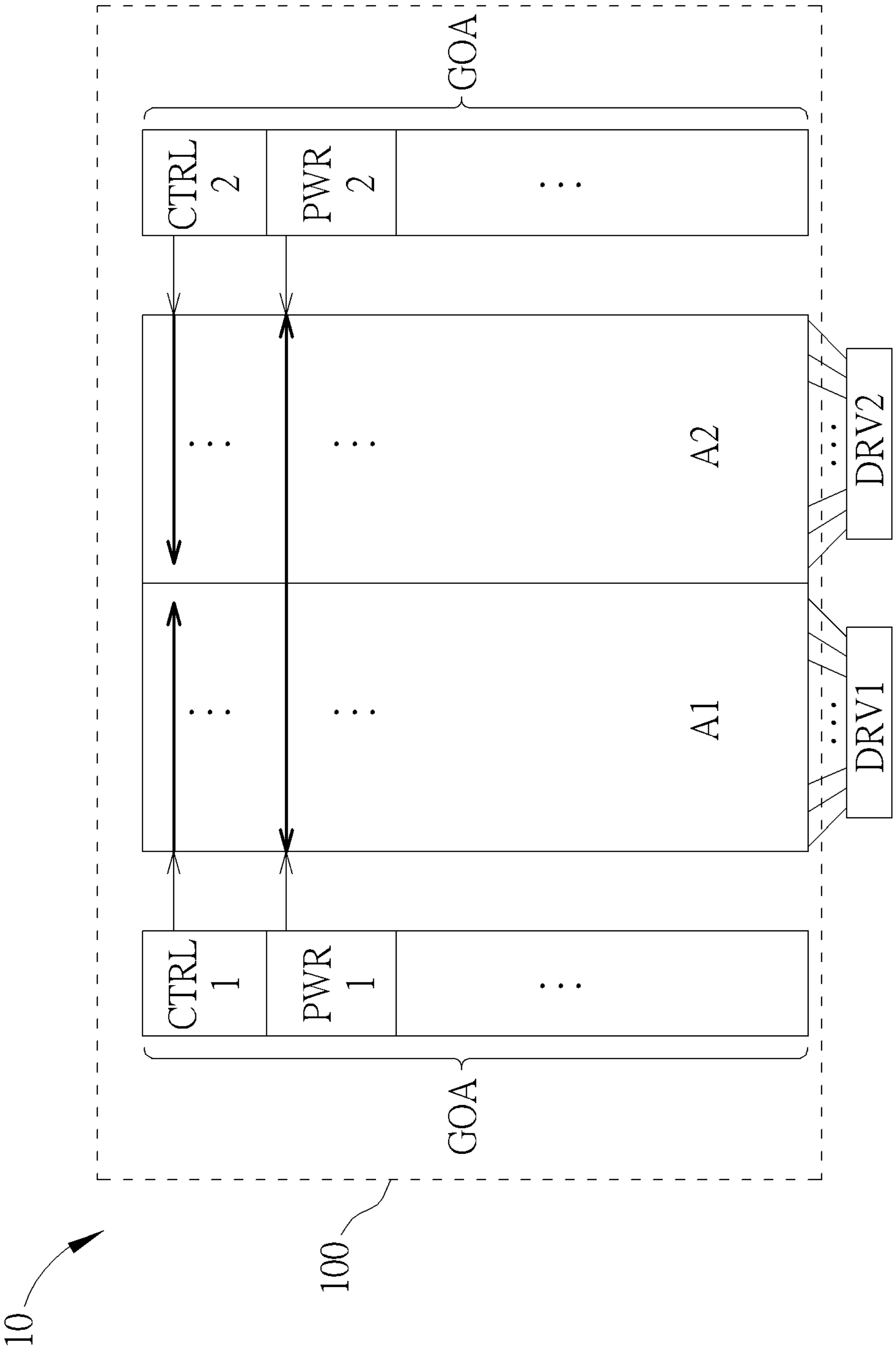
FIGS. 1A and 1B are schematic diagrams of exemplary display systems.
Figure 1B:
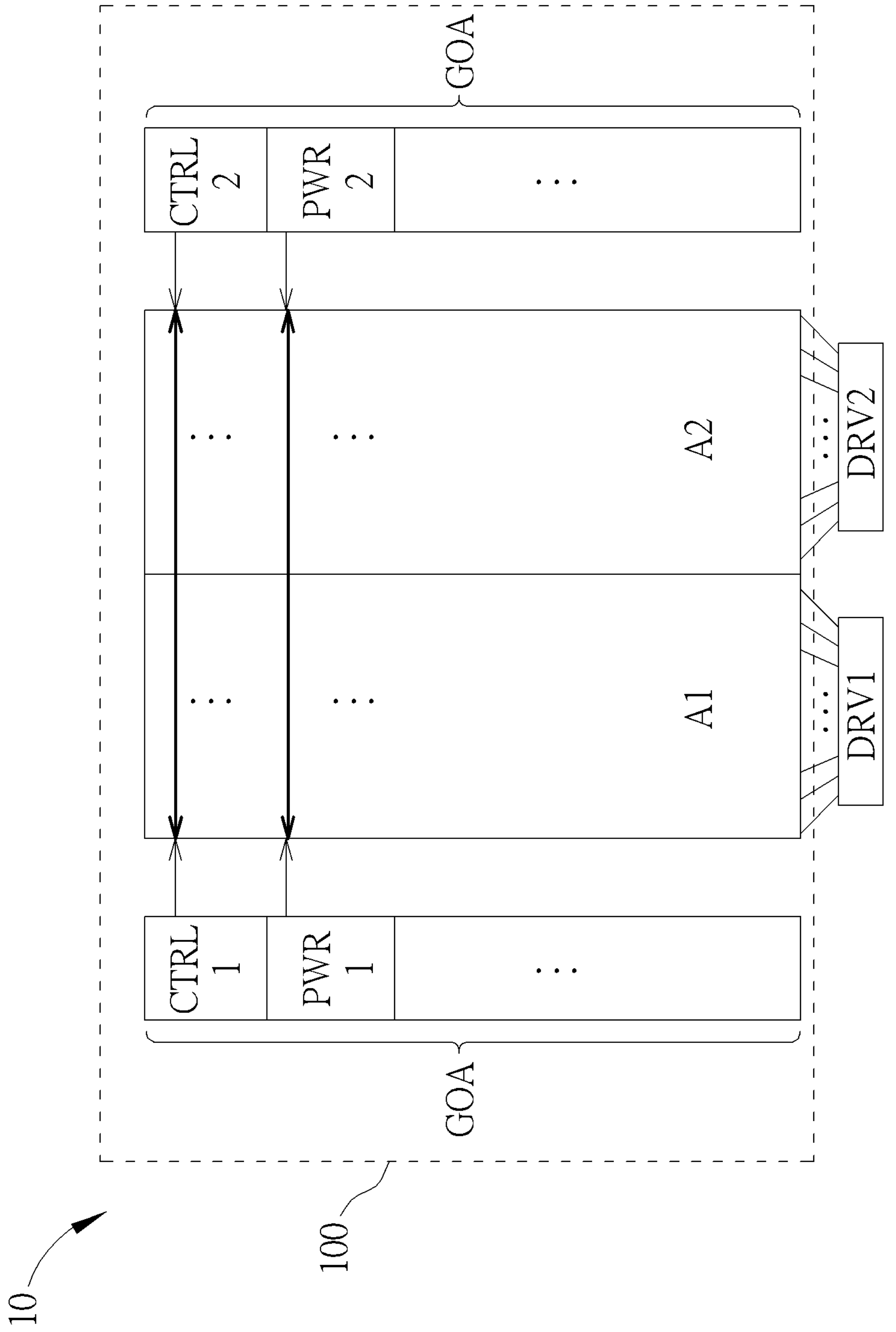

Please refer to FIGS. 1A and 1B, which are schematic diagrams of exemplary display systems. The display systems include organic light-emitting diode (OLED) panels and related driver circuits for controlling the OLED panels. In detail, each of FIGS. 1A and 1B illustrates a display system 10, which includes an OLED panel 100 and controllers for controlling the OLED panel 100. These controllers may include driver circuits DRV1 and DRV2, emission and scan controllers CTRL1 and CTRL2, and power controllers PWR1 and PWR2.

As shown in FIGS. 1A and 1B, the active area of the OLED panel 100 is divided into two areas A1 and A2, which are controlled and driven by the driver circuits DRV1 and DRV2, respectively. More specifically, the driver circuits DRV1 and DRV2 may cooperate to control the OLED panel 100, and output display data to the areas A1 and A2, respectively. The power controllers PWR1 and PWR2 are configured to provide supply voltages for the OLED panel 100. The supply voltages may include, but not limited to, power voltages, an initial voltage and gate control voltages.

The emission and scan controllers CTRL1 and CTRL2 are configured to output emission control signals and scan signals to the pixels on the OLED panel 100. The power controllers PWR1 and PWR2 and the emission and scan controllers CTRL1 and CTRL2 may be implemented on the non-active area of the OLED panel 100 by using the gate-on-array (GOA) technique.

In a conventional display system, with the partition control of the OLED panel 100, the driver circuits DRV1 and DRV2 are responsible for the control of the areas A1 and A2, respectively. When the driver circuit DRV1 outputs the display data to the area A1, it may output control signals to the emission and scan controller CTRL1, allowing the emission and scan controller CTRL1 to output the emission control signals and the scan signals to the pixels in the area A1. Similarly, when the driver circuit DRV2 outputs the display data to the area A2, it may output control signals to the emission and scan controller CTRL2, allowing the emission and scan controller CTRL2 to output the emission control signals and the scan signals to the pixels in the area A2. The driver circuits DRV1 and DRV2 should negotiate and synchronize with each other to make the image display accurate and smooth.

In addition, although the OLED panel 100 is partition controlled by two different driver circuits DRV1 and DRV2, the supply voltage lines on different areas A1 and A2 of the OLED panel 100 may be connected together and commonly coupled to and driven by the power controllers PWR1 and PWR2.

There are emission control lines and scan lines deployed on the OLED panel 100, for transmitting the emission control signals and the scan signals, respectively. The connections of the emission control lines and the scan lines have two types. The first type is shown in FIG. 1A, where the area A1 and the area A2 of the OLED panel 100 have their independent emission control lines and scan lines. The emission control lines and scan lines of the area A1 are coupled to and driven by the emission and scan controller CTRL1, which may be implemented as the GOA circuit in the non-active area on the left-hand side of the OLED panel 100. The emission control lines and scan lines of the area A2 are coupled to and driven by the emission and scan controller CTRL2, which may be implemented as the GOA circuit in the non-active area on the right-hand side of the OLED panel 100.

The second type is shown in FIG. 1B, where the emission control lines and scan lines in the areas A1 and A2 are connected together and commonly coupled to and driven by the emission and scan controller CTRL1 on the left-hand side and the emission and scan controller CTRL2 on the right-hand side.

Figure 2:
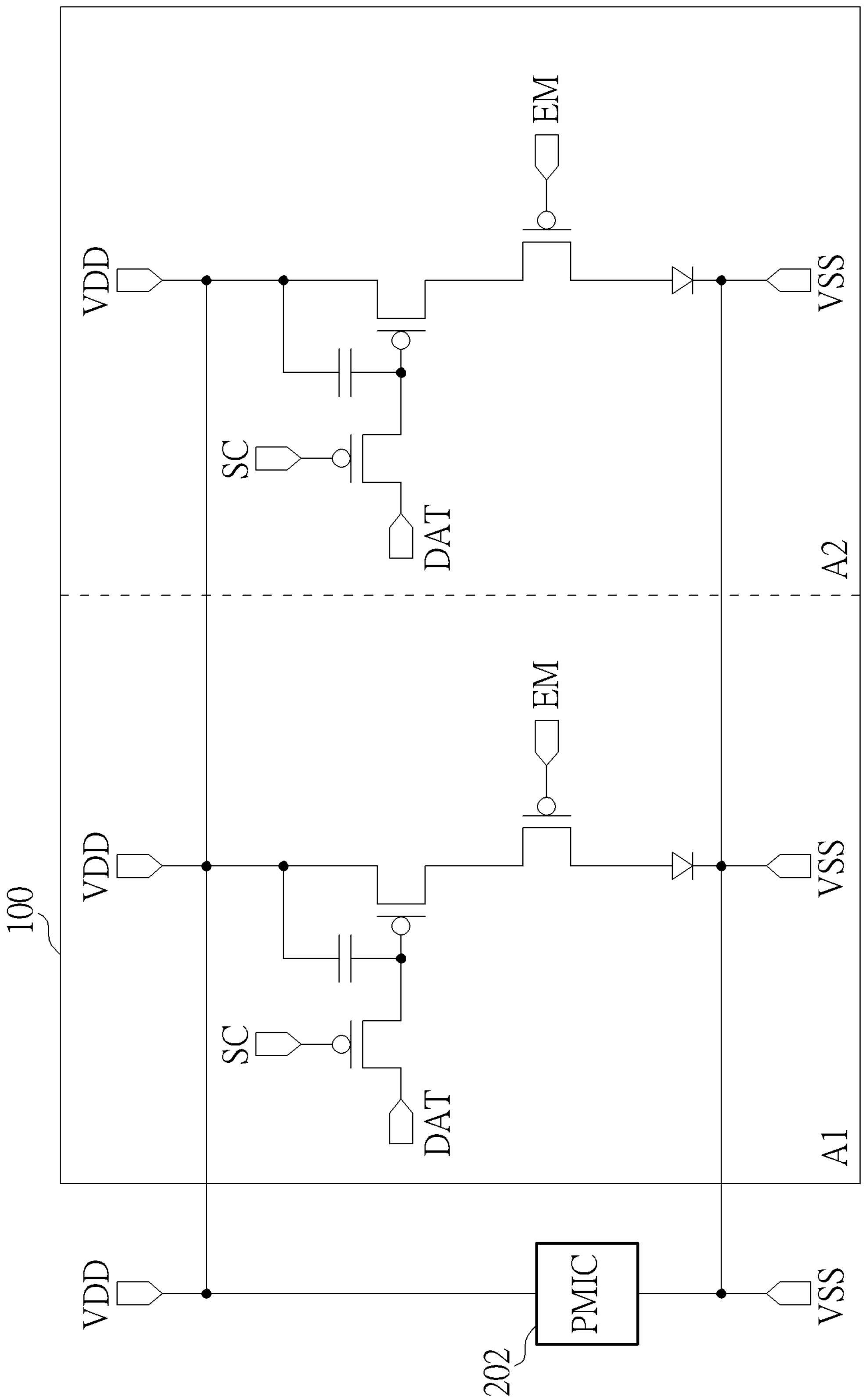
FIG. 2 illustrates a detailed structure of pixels on the OLED panel.

FIG. 2 illustrates a detailed structure of pixels on the OLED panel 100. As shown in FIG. 2, each OLED pixel may receive power voltages VDD and VSS, a scan signal SC, an emission control signal EM, and display data DAT. As for those pixels in the area A1, the scan signal SC, the emission control signal EM, and the display data DAT may be provided from the driver circuit DRV1 (directly or through the emission and scan controller CTRL1). As for those pixels in the area A2, the scan signal SC, the emission control signal EM, and the display data DAT may be provided from the driver circuit DRV2 (directly or through the emission and scan controller CTRL2). A power management integrated circuit (PMIC) 202 is configured to supply the power voltages VDD and VSS to the entire OLED panel 100. Since the areas A1 and A2 of the OLED panel 100 share the same PMIC 202, the PMIC 202 will supply the power voltages VDD and VSS to both areas A1 and A2 simultaneously. Correspondingly, the driver circuits DRV1 and DRV2 for controlling the areas A1 and A2 should be simultaneously on or off, and it is impossible to disable only one driver circuit in a power saving mode.

More specifically, as shown in FIG. 2, the emission control transistors in the OLED pixels are usually implemented with PMOS transistors, which are turned on when the emission control signal EM is at a low voltage level and turned off when the emission control signal EM is at a high voltage level. Therefore, the light emission function is disabled when the emission control signal EM is at the high voltage level, and enabled when the emission control signal EM is at the low voltage level. Reception of the display data DAT is stopped when the scan signal SC is at the high voltage level, and performed when the scan signal SC is at the low voltage level.

Please refer to FIG. 2 along with FIGS. 1A and 1B. As for the first type of structure as shown in FIG. 1A, if only one driver circuit is disabled, the corresponding emission control signal EM will be pulled to a low voltage level such as zero voltage, causing the panel to light up abnormally and fail to keep a black screen. As for the second type of structure as shown in FIG. 1B, since the scan lines and the emission control lines on the areas A1 and A2 are connected together, the disabled driver circuit (e.g., DRV1 or DRV2) will cause the corresponding signal source to be floating (or called high impedance) or in the low voltage level. At this moment, the scan signal SC and the emission control signal EM are provided from another driver circuit which is still enabled, such that the OLED panel 100 cannot keep black, and the OLED pixels are still driven by the scan signal SC and the emission control signal EM to be lit on abnormally, which cannot achieve the purpose of power saving.

Figure 3A:
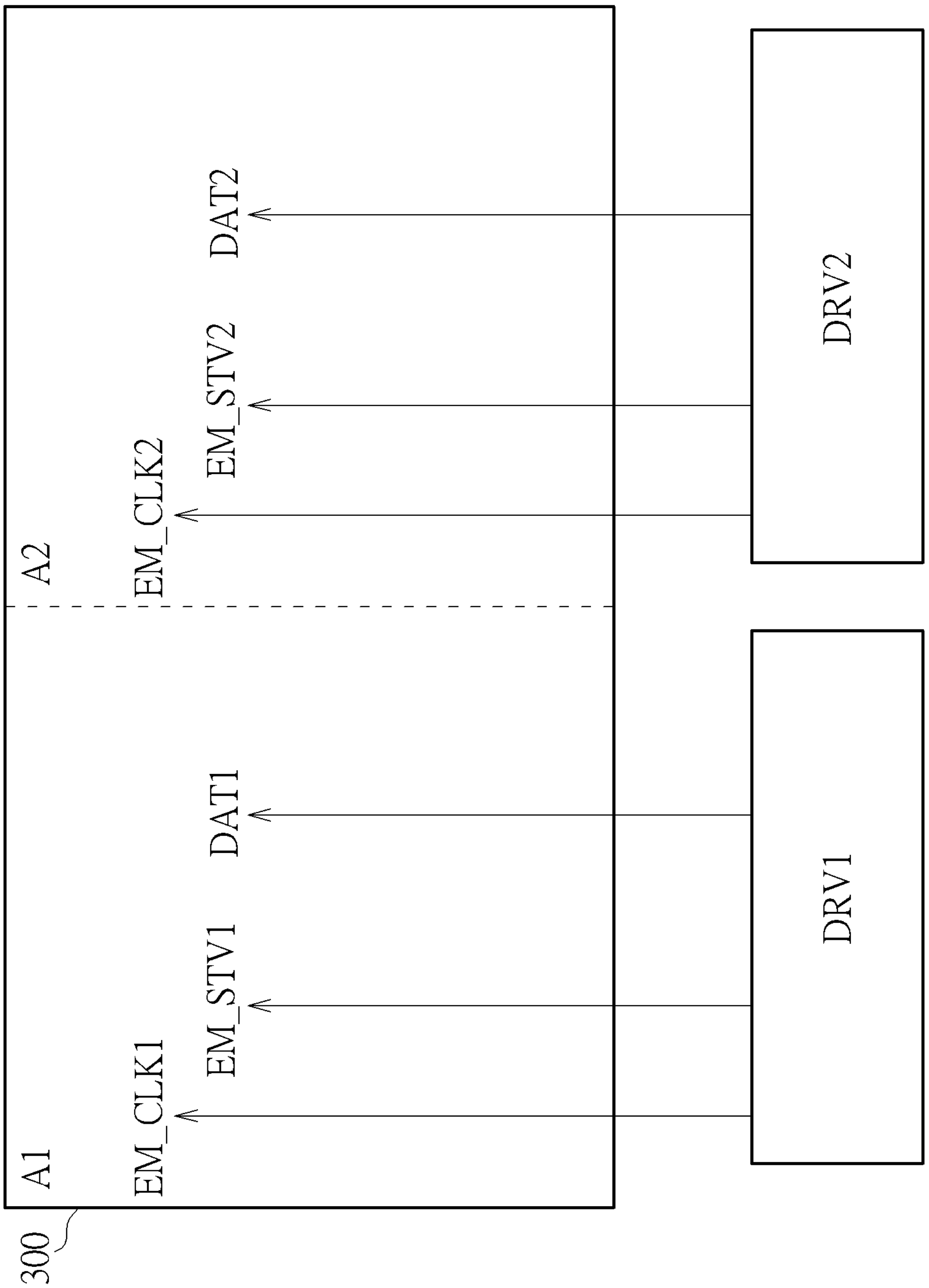
FIGS. 3A and 3B are schematic diagrams of a driving architecture of a general OLED panel.
Figure 3B:
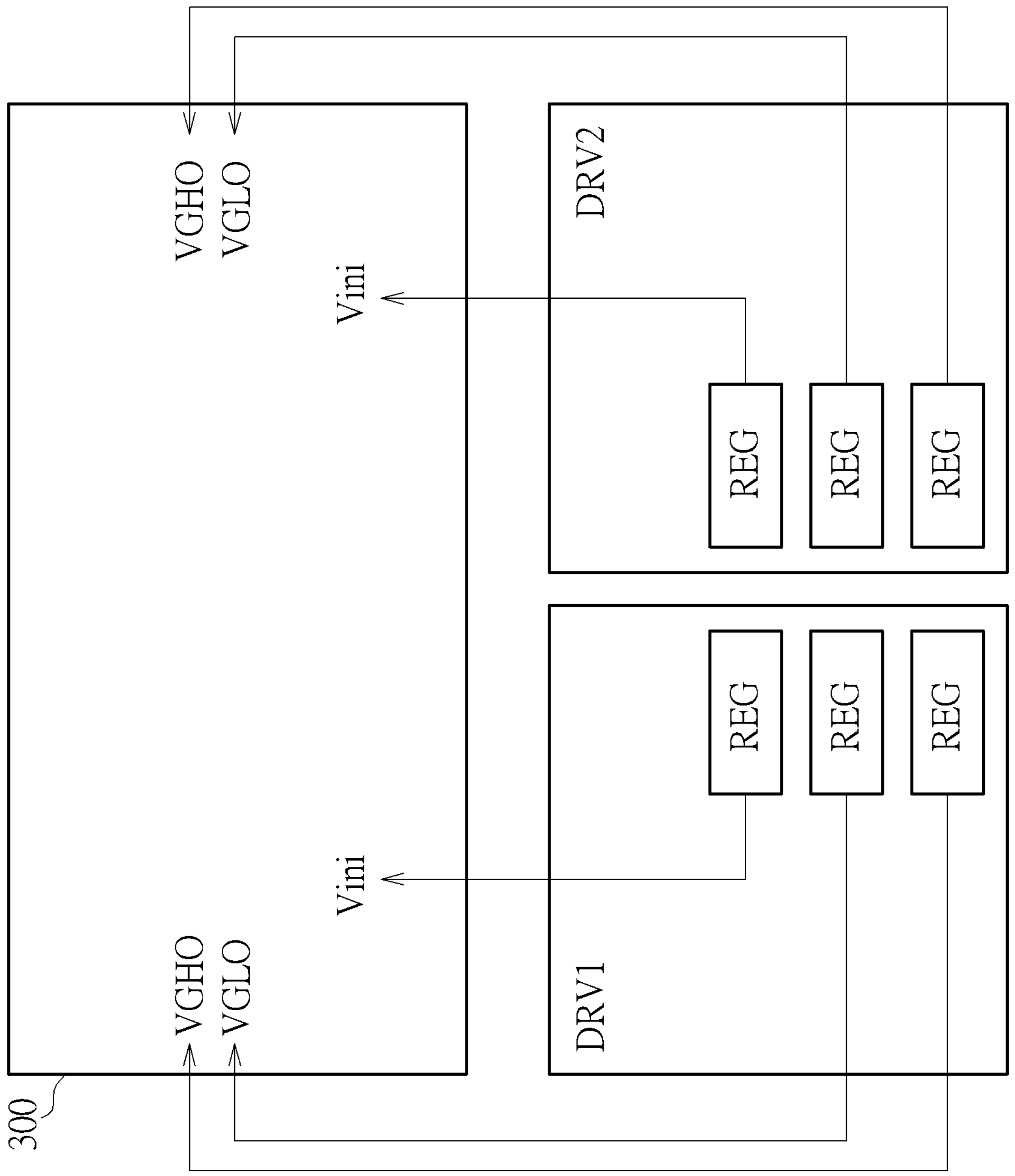

Please refer to FIGS. 3A and 3B, which are schematic diagrams of a driving architecture of a general OLED panel 300. FIG. 3A shows that the OLED panel 300 is partitioned into two areas A1 and A2, which are controlled by driver circuits DRV1 and DRV2, respectively. Based on the partition control, the driver circuit DRV1 is configured to output an emission control clock EM_CLK1 and an emission start pulse EM_STV1 to control the area A1 of the OLED panel 300, and correspondingly provide display data DAT1 for the area A1; and the driver circuit DRV2 is configured to output an emission control clock EM_CLK2 and an emission start pulse EM_STV2 to control the area A2 of the OLED panel 300, and correspondingly provide display data DAT2 for the area A2.

Please note that the display data DAT1 and DAT2 may be output to the corresponding OLED pixels through the data lines on the OLED panel 300. The emission control clocks EM_CLK1 and EM_CLK2 and the emission start pulses EM_STV1 and EM_STV2 may be output to the GOA circuits, which are usually deployed on the left-hand side and the right-hand side of the OLED panel 300, respectively. FIG. 3A shows that the driver circuits DRV1 and DRV2 respectively output the emission control clocks EM_CLK1 and EM_CLK2 and the emission start pulses EM_STV1 and EM_STV2 to the areas A1 and A2 of the OLED panel 300. The illustrations mean that the emission control clock EM_CLK1 and the emission start pulse EM_STV1 are used for controlling the area A1, and that the emission control clock EM_CLK2 and the emission start pulse EM_STV2 are used for controlling the area A2. The related GOA circuits are omitted herein for brevity, and those skilled in the art can refer to FIGS. 1A and 1B to understand the emission control of the OLED panel 300 with the GOA circuits.

In addition, the driver circuits DRV1 and DRV2 are configured to provide several supply voltages required by the OLED panel 300, such as the gate control voltages VGHO and VGLO and the initial voltage Vini, as shown in FIG. 3B. The gate control voltages VGHO and VGLO are used to generate the voltage of the scan signals, and may be output to the GOA circuit from the driver circuits DRV1 and DRV2. The initial voltage Vini may be output to the pixels on the OLED panel 300, for controlling the initialization of the pixels. In general, each of the driver circuits DRV1 and DRV2 may include several regulators (REGs) used for generating these supply voltages VGHO, VGLO and Vini.

The present invention provides a power saving method for an OLED panel controlled by multiple driver circuits. In a display system where an OLED panel is commonly controlled by the driver circuits DRV1 and DRV2, the area controlled by the driver circuit DRV2 may receive at least one emission control signal such as an emission control clock and/or an emission start pulse from the driver circuit DRV1. In other words, the driver circuit DRV1 may output at least one emission control signal such as an emission control clock and/or an emission start pulse to the area receiving display data from the driver circuit DRV2. Therefore, it is allowed to disable the driver circuit DRV2 while keeping the driver circuit DRV1 active in the power saving mode. Various embodiments are described as follows.

Figure 4A:
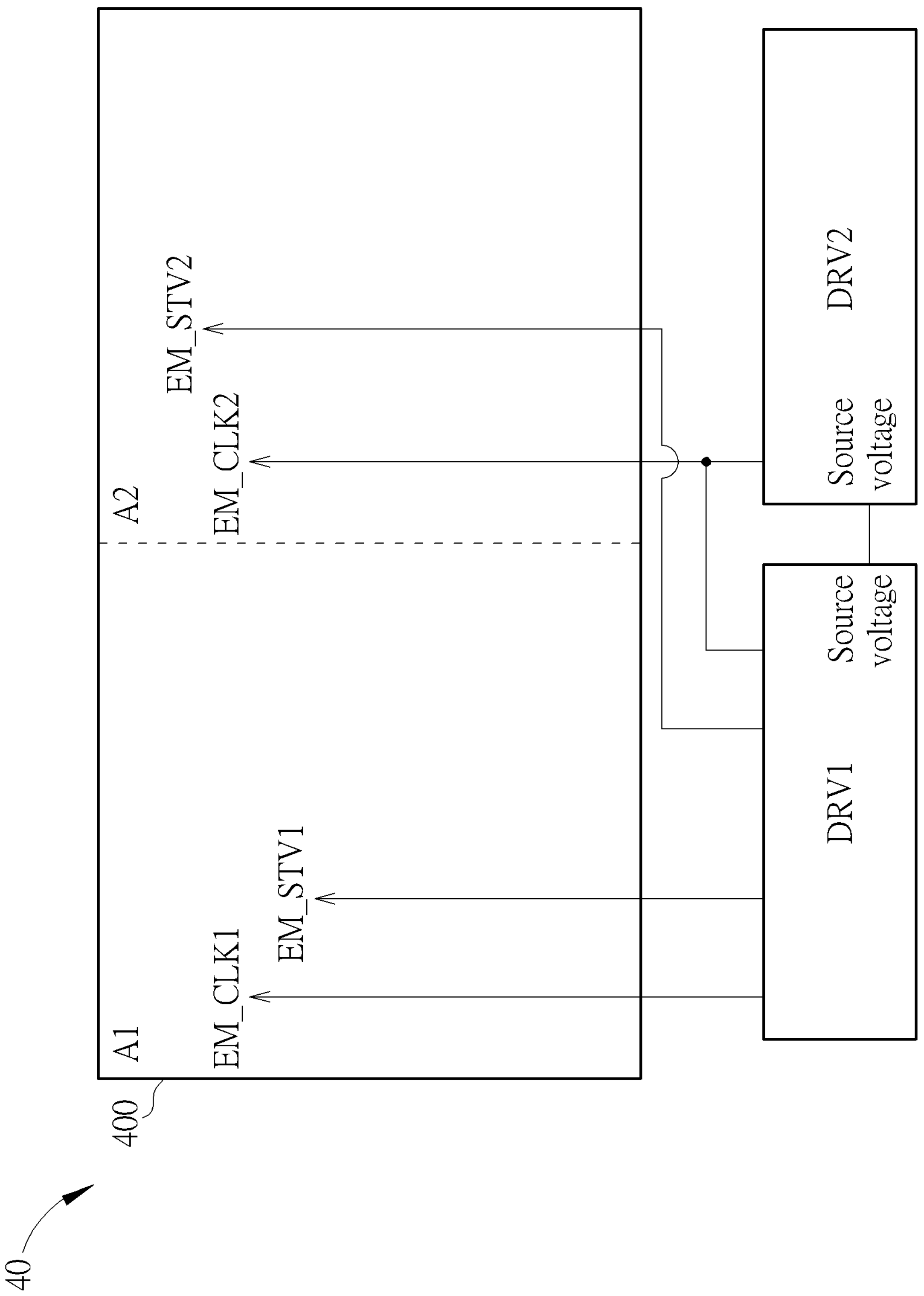
FIGS. 4A and 4B are schematic diagrams of a display system according to an embodiment of the present invention.

Please refer to FIG. 4A, which is a schematic diagram of a display system 40 according to an embodiment of the present invention. As shown in FIG. 4, the display system 40 includes an OLED panel 400, which is partitioned into two areas A1 and A2, and the areas A1 and A2 are controlled by driver circuits DRV1 and DRV2, respectively. In this embodiment, the driver circuit DRV1 may output the emission control clock EM_CLK1 and the emission start pulse EM_STV1 to control the area A1 of the OLED panel 400. In addition to outputting the emission start pulse EM_STV1 for the area A1, the driver circuit DRV1 may also output the emission start pulse EM_STV2 to control the area A2 of the OLED panel 400. Therefore, no matter whether the driver circuit DRV2 is enabled or disabled, the emission start pulse EM_STV2 of the area A2 may be provided from the driver circuit DRV1. In the power saving mode, the driver circuit DRV2 may be disabled, and the driver circuit DRV1 may output the emission start pulse EM_STV2 to control the area A2 to scan black appropriately.

In addition, the emission control clock EM_CLK2 for controlling the area A2 is commonly output by the driver circuits DRV1 and DRV2, as shown in FIG. 4A. The operation is feasible if the driver circuits DRV1 and DRV2 are well synchronized. Therefore, in the normal display mode, the driver circuits DRV1 and DRV2 are both enabled and may commonly output the emission control clock EM_CLK2 to enhance the driving capability. Alternatively, the clock output terminal of the driver circuit DRV1 may be configured to be floating (i.e., high impedance), and the driver circuit DRV2 outputs the emission control clock EM_CLK2 to the area A2 by itself, and vice versa. In the power saving mode, the driver circuit DRV2 may be disabled, and the driver circuit DRV1 may still output the emission control clock EM_CLK2 to the area A2.

In this embodiment, the driver circuit DRV1 is configured to output display data to the area A1, and the driver circuit DRV2 is configured to output display data to the area A2. The flows of the display data are omitted in FIG. 4A for brevity.

As a result, with the connection scheme as shown in FIG. 4A, when the driver circuit DRV2 is disabled, the driver circuit DRV1 may still perform emission control on the area A2 by outputting the emission control clock EM_CLK2 and the emission start pulse EM_STV2 (e.g., to the GOA circuit corresponding to the area A2). Therefore, the area A2 of the OLED panel 400 can operate normally, and the abnormal emission in the power saving mode may be prevented.

Figure 4B:
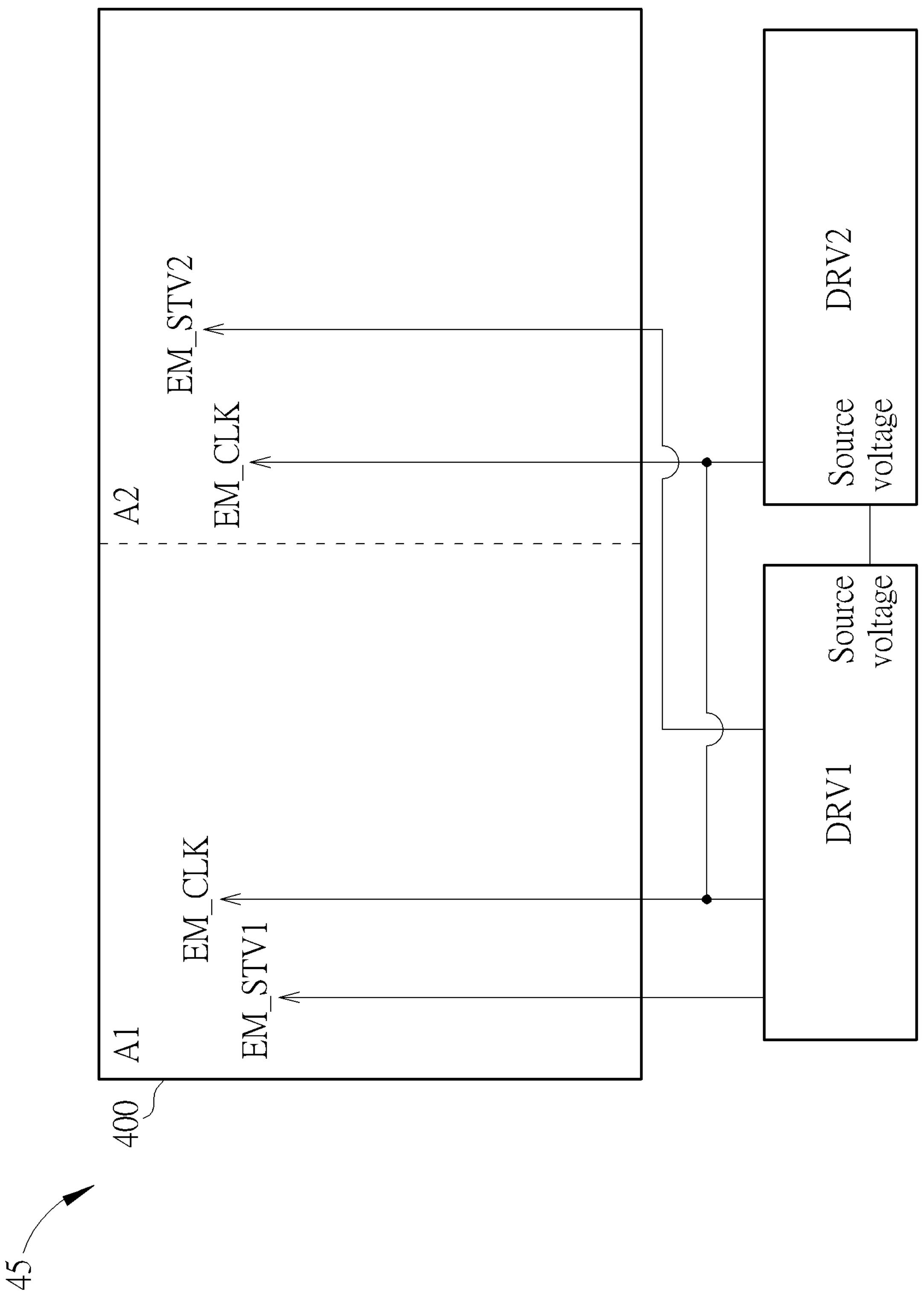

Please refer to FIG. 4B, which is a schematic diagram of another display system 45 according to an embodiment of the present invention. As shown in FIG. 4B, the structure of the display system 45 is similar to the structure of the display system 40, so signals and elements having similar functions are denoted by the same symbols. The difference between the display system 45 and the display system 40 is that, in the display system 45, the driver circuits DRV1 and DRV2 commonly output an emission control clock EM_CLK for the areas A1 and A2 of the OLED panel 400. In other words, the same emission control clock EM_CLK, which is provided from the driver circuits DRV1 and DRV2 in common, is output to the areas A1 and A2. The clock output terminal of the driver circuit DRV1 and the clock output terminal of the driver circuit DRV2 may be coupled to each other to achieve this purpose.

More specifically, in the display system 40 as shown in FIG. 4A, the driver circuit DRV1 includes a first clock output terminal for outputting the emission control clock EM_CLK1 to the area A1, and a second clock output terminal for outputting the emission control clock EM_CLK2 along with the driver circuit DRV2. In the display system 45 as shown in FIG. 4B, the emission control clock EM_CLK may be commonly output by the same clock output terminal of the driver circuit DRV1 and the same clock output terminal of the driver circuit DRV2, in order to reduce the pin count of the driver circuit DRV1.

Similarly, in the display system 45, in the power saving mode when the driver circuit DRV2 is disabled, the driver circuit DRV1 may output the emission control clock EM_CLK and the emission start pulses EM_STV1 and EM_STV2 in an appropriate manner, to control the OLED panel to scan black. The detailed operations are similar to those described above, and will not be narrated herein.

Figure 4C:
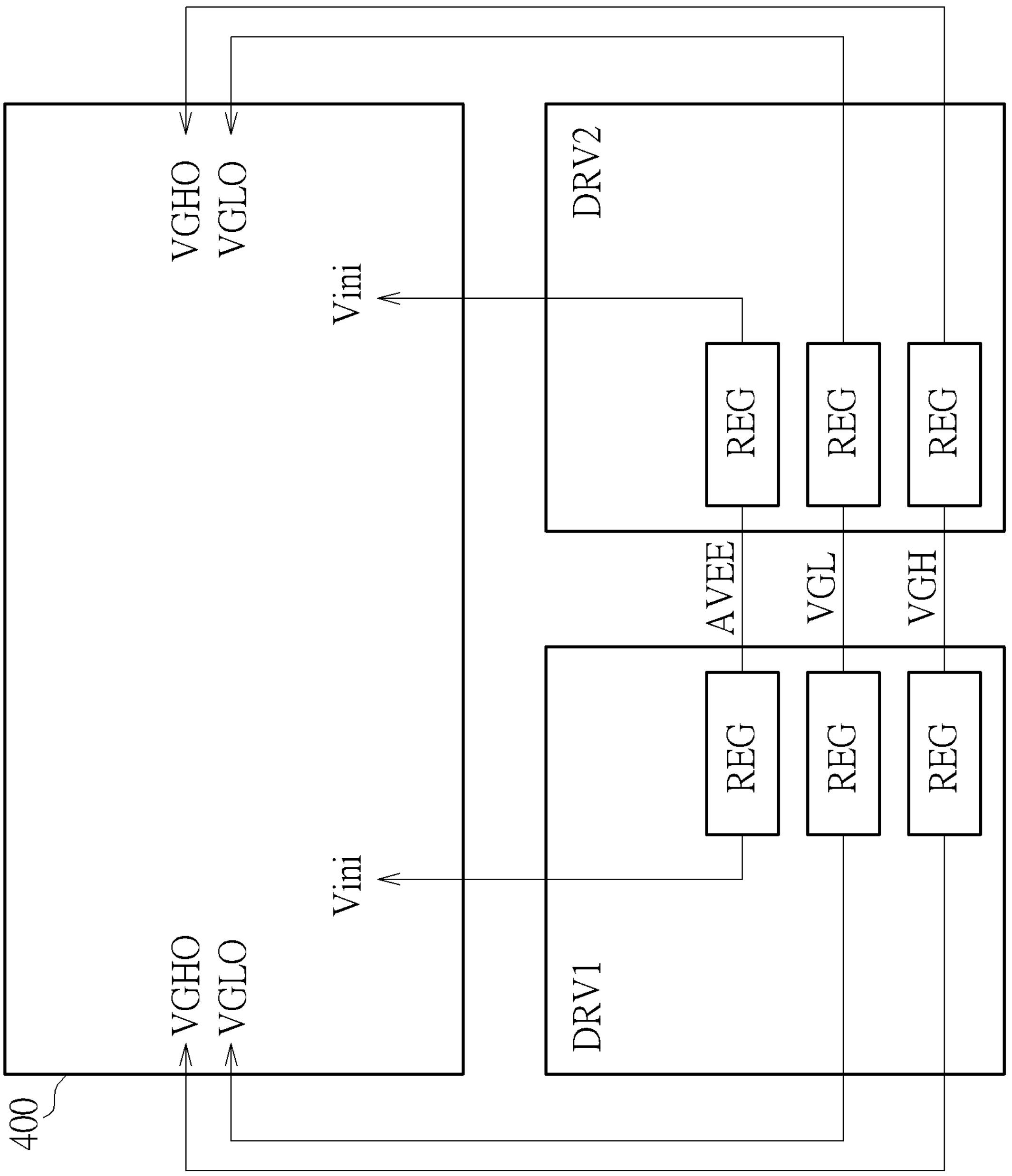
FIG. 4C illustrates a deployment of the supply voltages for the OLED panel.

FIG. 4C illustrates a deployment of the supply voltages for the OLED panel 400. As mentioned above, the driver circuits DRV1 and DRV2 may output various supply voltages such as the gate control voltages VGHO and VGLO and the initial voltage Vini to the OLED panel 400, to allow the OLED panel 400 to operate normally. The initial voltage Vini may be generated from a source voltage AVEE through a regulator in each of the driver circuits DRV1 and DRV2. The gate control voltage VGHO may be generated from a source voltage VGH through a regulator in each of the driver circuits DRV1 and DRV2. The gate control voltage VGLO may be generated from a source voltage VGL through a regulator in each of the driver circuits DRV1 and DRV2.

In general, the signal lines for these supply voltages are connected on the panel. Therefore, in the normal operation mode, the driver circuits DRV1 and DRV2 may commonly output these supply voltages to control all the pixels on the OLED panel 400. In the power saving mode, when the driver circuit DRV2 is disabled, the driver circuit DRV1 may still output the supply voltages to the OLED panel 400, and the supply voltages will be transmitted to the output terminals of the driver circuit DRV2 through the signal lines on the panel. However, because the driver circuit DRV2 is in a power-off status, the regulators for these supply voltages VGHO, VGLO and Vini cannot be maintained in a normal bias status, easily causing the regulators in the driver circuit DRV2 to appear power leakage. In order to avoid the leakage, the terminals of the source voltages VGH, VGL and AVEE of the driver circuits DRV1 and DRV2 may be connected to each other. More specifically, the source voltage terminal of VGH of the driver circuit DRV1 is coupled to the source voltage terminal of VGH of the driver circuit DRV2, the source voltage terminal of VGL of the driver circuit DRV1 is coupled to the source voltage terminal of VGL of the driver circuit DRV2, and the source voltage terminal of AVEE of the driver circuit DRV1 is coupled to the source voltage terminal of AVEE of the driver circuit DRV2, as shown in FIG. 4C. As a result, even when the driver circuit DRV2 is disabled, the front ends of the internal regulators may still receive the source voltages VGH, VGL and AVEE, which along with the back-end voltages VGHO, VGLO and Vini allow the regulators to be in a normal bias status, so as to avoid the power leakage.

Figure 5A:
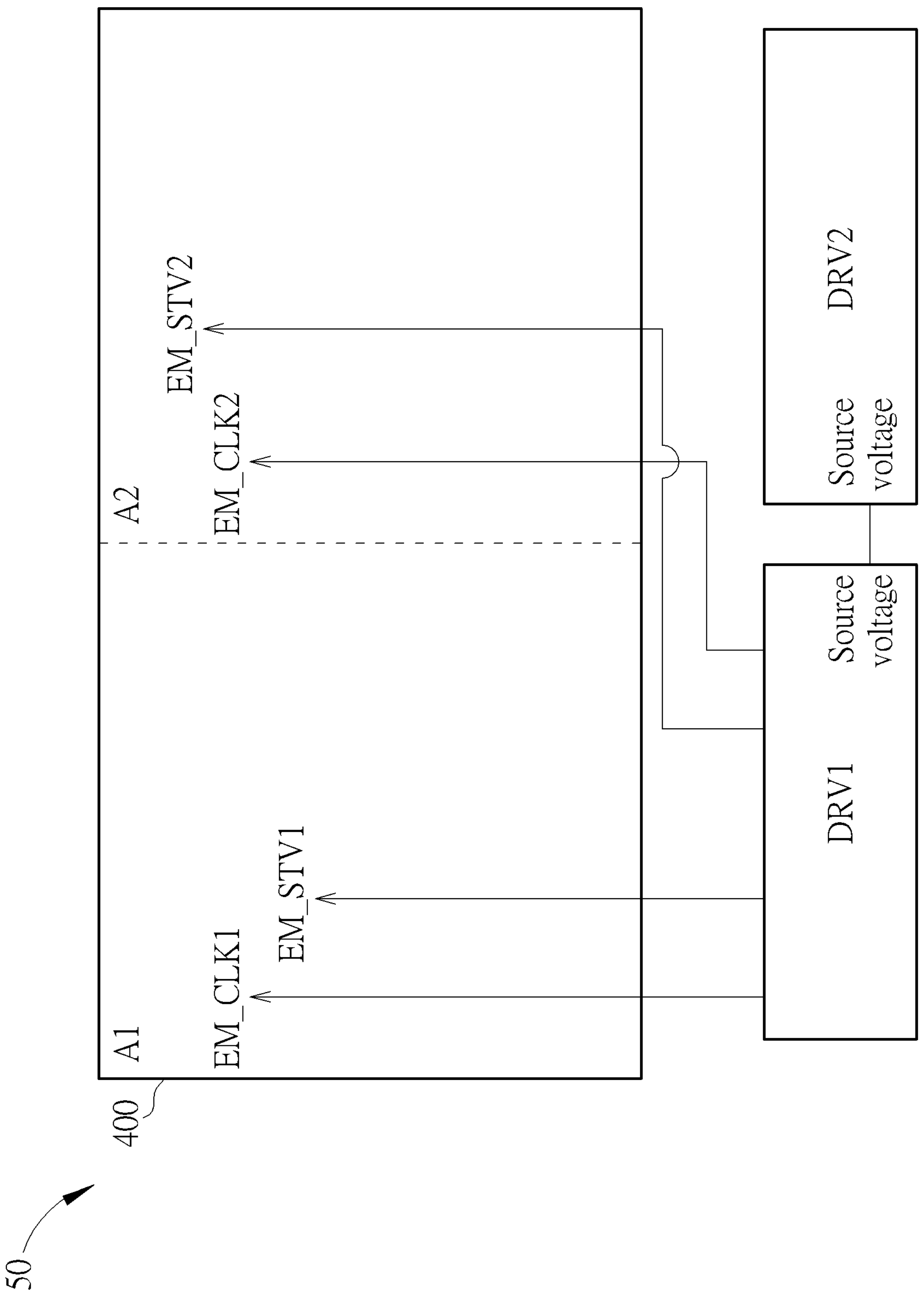
FIGS. 5A-11 are schematic diagrams of a display system according to an embodiment of the present invention.

Please refer to FIG. 5A, which is a schematic diagram of a display system 50 according to an embodiment of the present invention. As shown in FIG. 5A, the structure of the display system 50 is similar to the structure of the display system 40, so signals and elements having similar functions are denoted by the same symbols. The difference between the display system 50 and the display system 40 is that, in the display system 50, the emission control clock EM_CLK2 for the area A2 of the OLED panel 400 is always received from the driver circuit DRV1, and the driver circuit DRV2 does not provide any emission control signal for the OLED panel 400.

Therefore, in this embodiment, the driver circuit DRV1 outputs the emission start pulse EM_STV1 and the emission control clock EM_CLK1 for controlling the area A1 of the OLED panel 400, and also outputs the emission start pulse EM_STV2 and the emission control clock EM_CLK2 for controlling the area A2 of the OLED panel 400. In such a situation, the area A2 receives the display data from the driver circuit DRV2, but the required emission control signals are all received from the driver circuit DRV1. As a result, in the power saving mode, when the driver circuit DRV2 is disabled, the driver circuit DRV1 may still perform emission control on the area A2, so as to prevent the area A2 from emitting light abnormally.

Figure 5B:
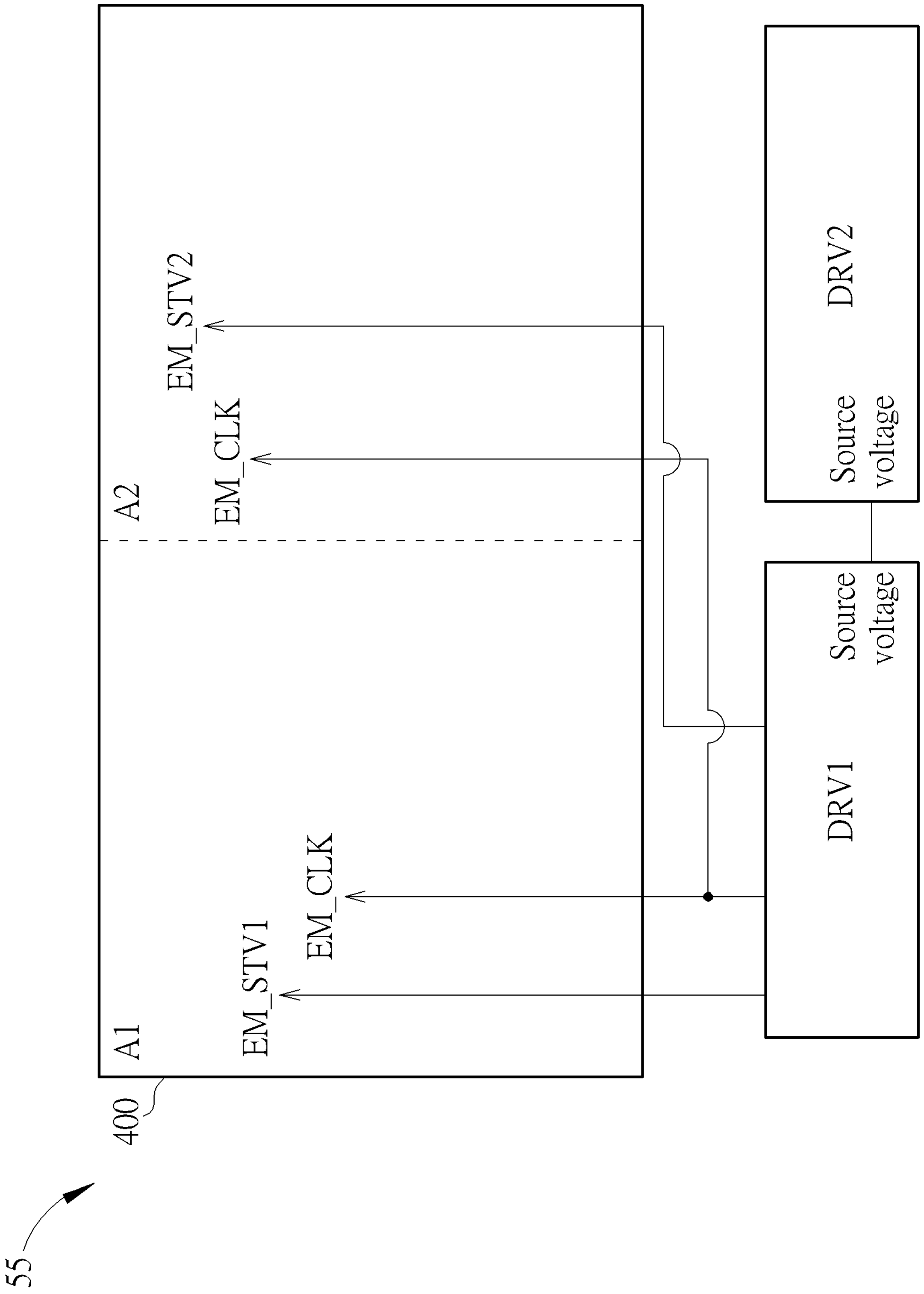

In the display system 50 as shown in FIG. 5A, the driver circuit DRV1 outputs the emission control clock EM_CLK1 through a clock output terminal and outputs the emission control clock EM_CLK2 through another clock output terminal. In another embodiment, the driver circuit DRV1 may output the emission control clock for different areas of the panel through the same clock output terminal, as shown in FIG. 5B. In the display system 55 as shown in FIG. 5B, the same emission control clock EM_CLK is output to the areas A1 and A2 through the same clock output terminal. Therefore, in the power saving mode, the driver circuit DRV2 may be disabled to achieve similar power saving effects by allowing the driver circuit DRV1 to output the emission control clock EM_CLK and the emission control pulses EM_STV1 and EM_STV2 appropriately.

Figure 6A:
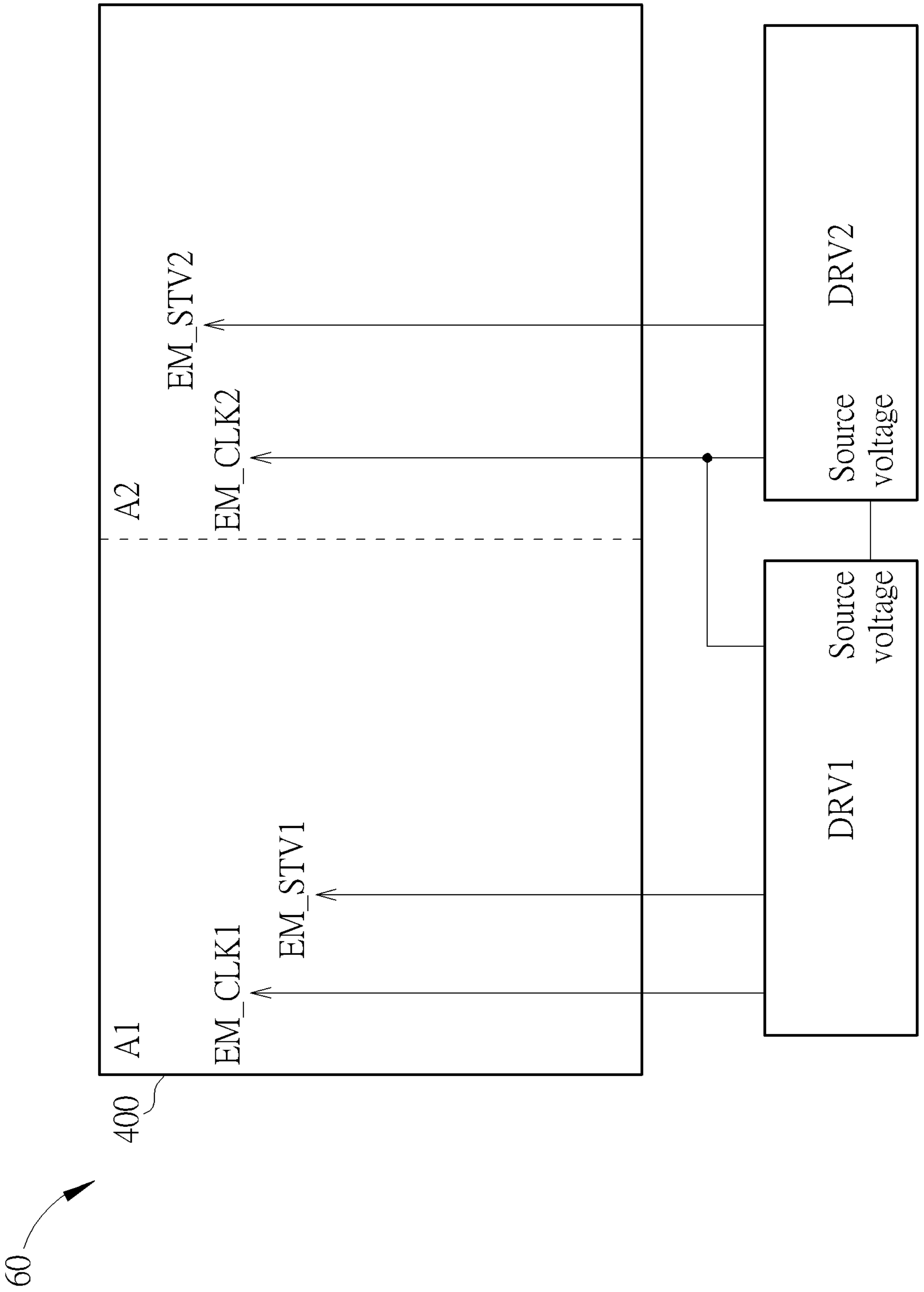

Please refer to FIG. 6A, which is a schematic diagram of a display system 60 according to an embodiment of the present invention. As shown in FIG. 6A, the structure of the display system. 60 is similar to the structure of the display system 40, so signals and elements having similar functions are denoted by the same symbols. The difference between the display system 60 and the display system 40 is that, in the display system 60, the driver circuit DRV1 provides the emission start pulse EM_STV1 for the area A1 of the OLED panel 400, and the driver circuit DRV2 provides the emission start pulse EM_STV2 for the area A2 of the OLED panel 400. Therefore, in the normal operation mode, the driver circuits DRV1 and DRV2 may output their respective emission start pulses EM_STV1 and EM_STV2 to the corresponding area. In the power saving mode, when the driver circuit DRV2 is disabled, the driver circuit DRV1 may provide the emission control clock EM_CLK2 for the area A2, while the driver circuit DRV2 may lock the output terminal of the emission start pulse EM_STV2 on a high level, so as to keep black screen and prevent the OLED panel 400 from emitting light abnormally. In such a situation, the driver circuit DRV2 may include a dedicated circuit, which is capable of pulling the output terminal of the emission start pulse EM_STV2 to the high level when the driver circuit DRV2 is disabled.

In the display system 60 as shown in FIG. 6A, the driver circuit DRV1 outputs the emission control clock EM_CLK1 through a clock output terminal and outputs the emission control clock EM_CLK2 through another clock output terminal. Similarly, the output structure of the emission control clock may be modified as the implementation of the display system 65 shown in FIG. 6B. That is, the driver circuit DRV1 outputs the same emission control clock EM_CLK for different areas of the panel through the same clock output terminal. The detailed operations of the display system 65 may be referred to the above paragraphs, and will be omitted herein.

Figure 7A:
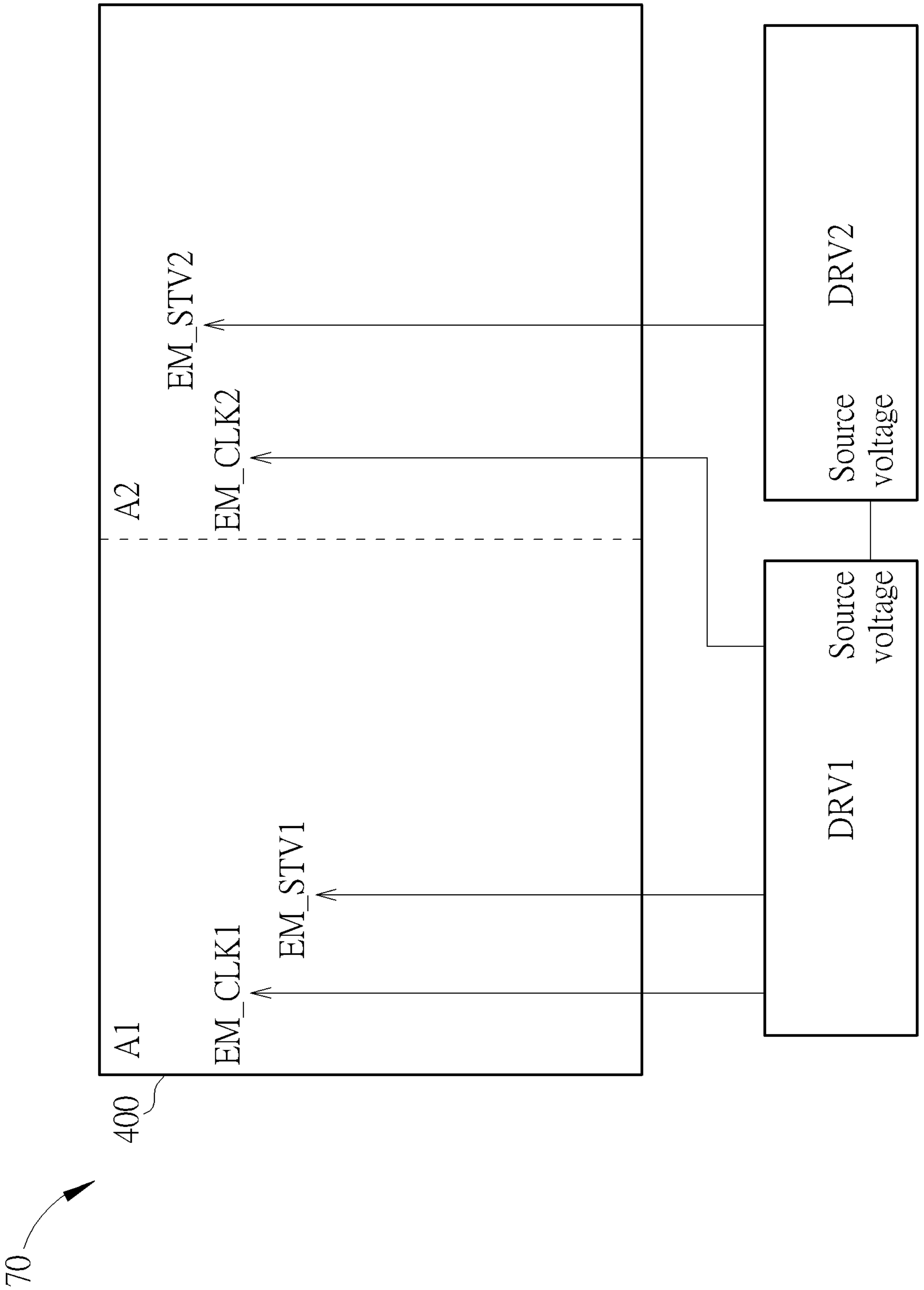
Figure 7B:
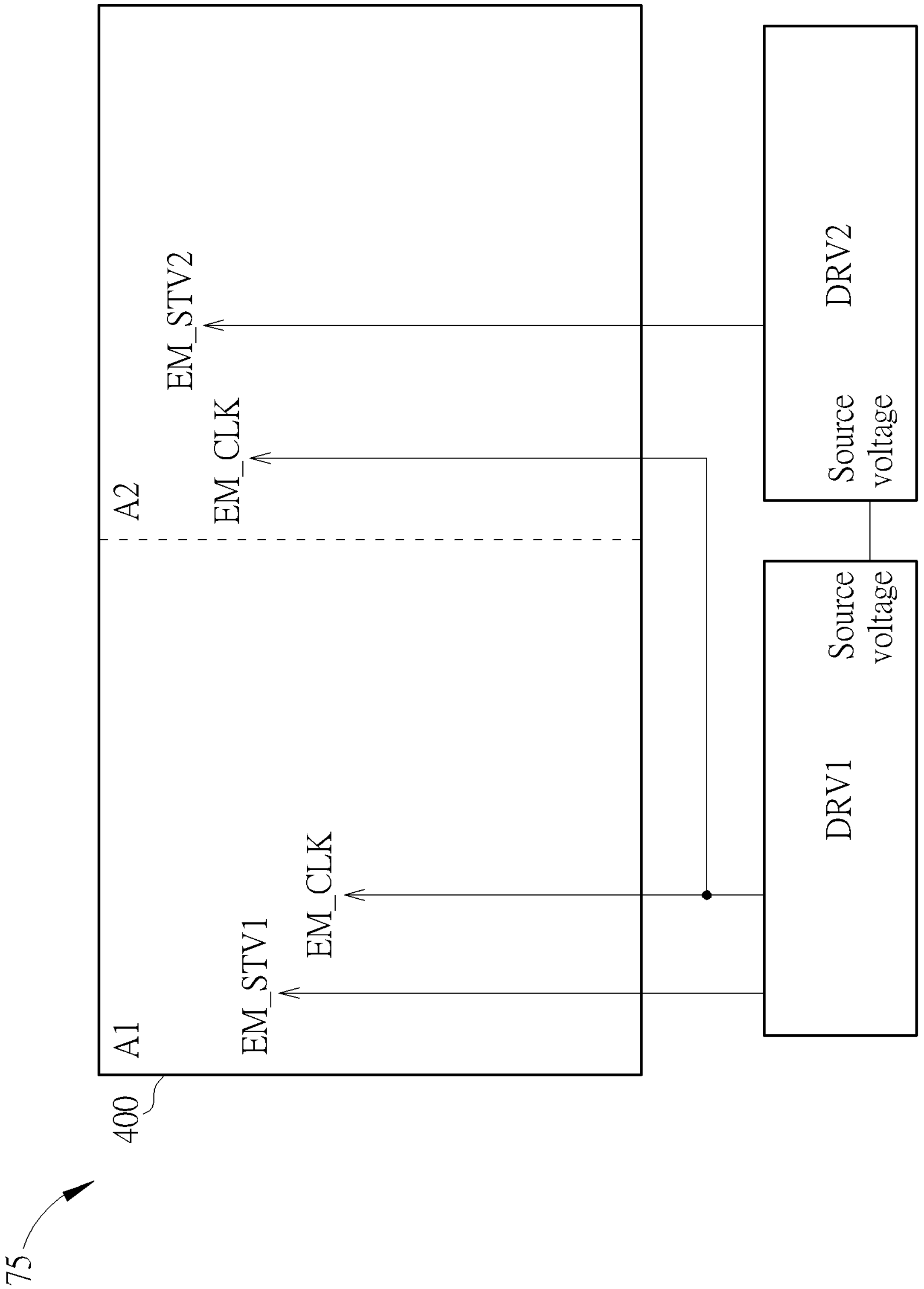

In the embodiments of the present invention, the output schemes of the emission control clock and the emission start pulse may be combined in any appropriate manner, to control the OLED panel appropriately and avoid abnormal emission in the power saving mode. For example, FIGS. 7A and 7B illustrate the display systems 70 and 75 in other embodiments. As shown in FIG. 7A, in the display system 70, the implementations of the emission control clocks EM_CLK1 and EM_CLK2 are similar to those shown in FIG. 5A, where the driver circuit DRV1 provides the emission control clocks EM_CLK1 and EM_CLK2 for the areas A1 and A2, respectively. The implementations of the emission start pulses EM_STV1 and EM_STV2 are similar to those shown in FIG. 6A, where the driver circuits DRV1 and DRV2 provide the emission start pulses EM_STV1 and EM_STV2 for the corresponding areas A1 and A2, respectively. Similarly, when the driver circuit DRV2 is disabled in the power saving mode, it may lock the output terminal of the emission start pulse EM_STV2 on the high level, which disables the emission functions of the OLED panel 400. Therefore, the OLED panel 400 may keep a black screen and the abnormal emission may be avoided.

Figure 6B:
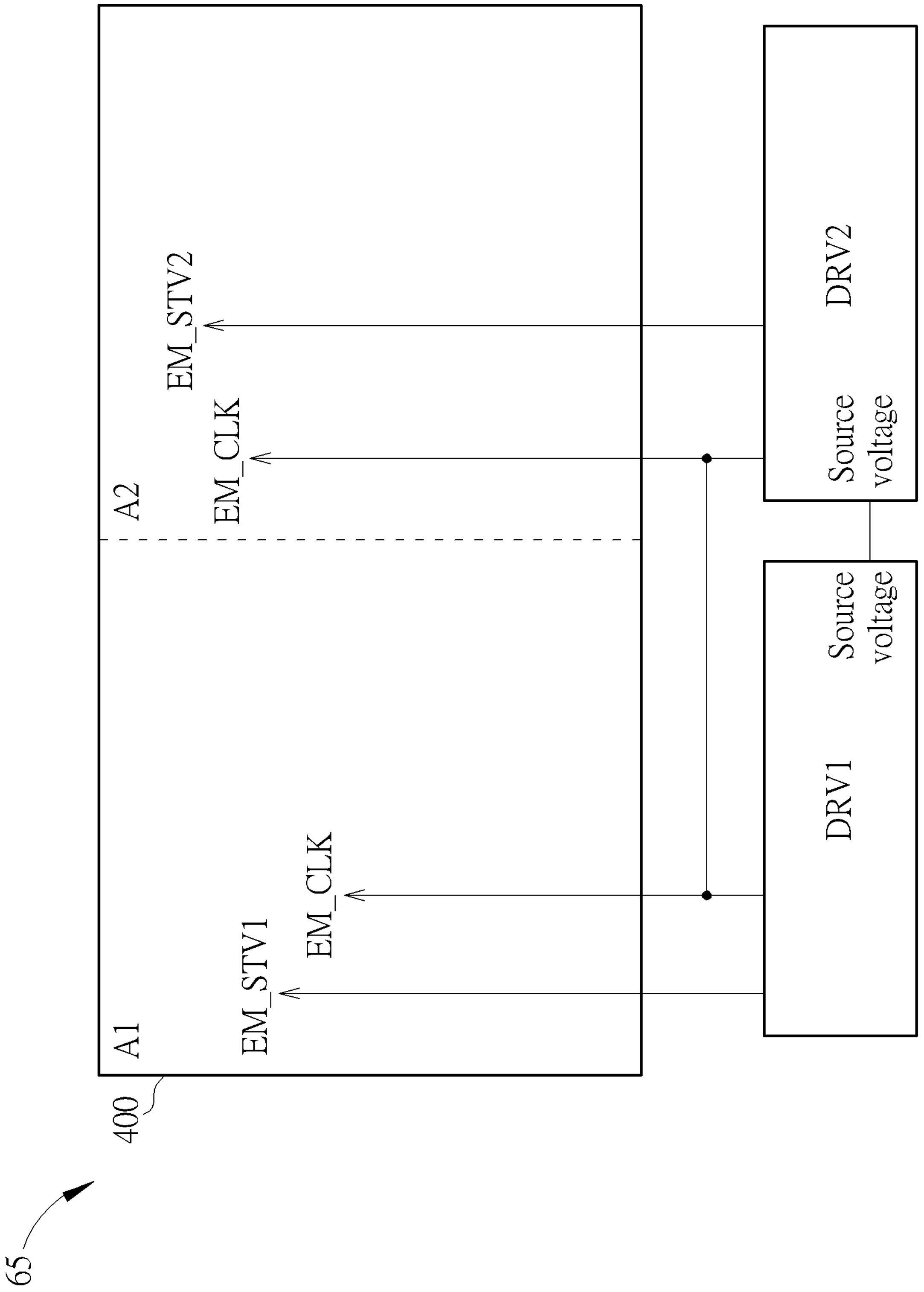

In the display system 75 as shown in FIG. 7B, the implementations of the emission control clock EM_CLK are similar to those shown in FIG. 5B, and the implementations of the emission start pulses EM_STV1 and EM_STV2 are similar to those shown in FIG. 6B. The detailed operations of the display system 75 may be referred to the above paragraphs, and will be omitted herein.

Figure 8A:
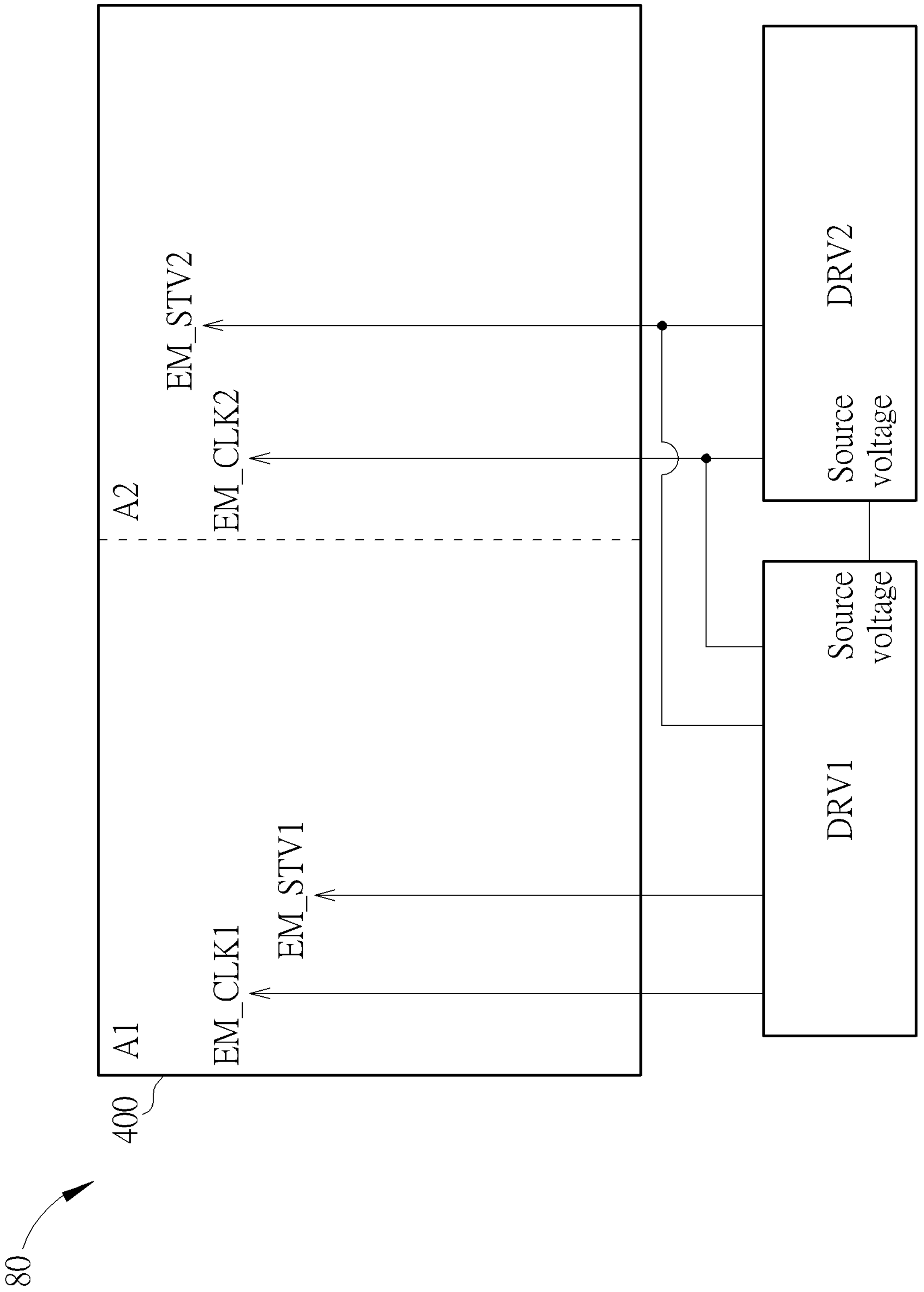

Please refer to FIG. 8A, which is a schematic diagram of a display system 80 according to an embodiment of the present invention. As shown in FIG. 8A, the driver circuit DRV1 may output the emission control clock EM_CLK1 and the emission start pulse EM_STV1 for controlling the area A1, and also output the emission control clock EM_CLK2 and the emission start pulse EM_STV2 for controlling the area A2. Therefore, both the emission control clock EM_CLK2 and the emission start pulse EM_STV2 for the area A2 are provided from the driver circuits DRV1 and DRV2 in common.

The implementations of the emission control clocks EM_CLK1 and EM_CLK2 are similar to those described in FIG. 4A, where the detailed operations can be referred to the above paragraphs. In addition, the operations of the emission start pulse EM_STV2 for the area A2 will be described below. In the normal operation mode, the driver circuits DRV1 and DRV2 may provide the emission start pulses EM_STV1 and EM_STV2 for the corresponding areas A1 and A2 of the panel, respectively. At this moment, the start pulse output terminal for the emission start pulse EM_STV2 of the driver circuit DRV1 may be configured to be floating (i.e., high impedance), so that the emission start pulse EM_STV2 is output from the driver circuit DRV2 itself. In the power saving mode, when the driver circuit DRV2 is disabled, the driver circuit DRV1 provides the emission start pulse EM_STV2 instead. In an embodiment, the driver circuit DRV1 may output a high voltage as the emission start pulse EM_STV2, so as to scan black on the panel. Meanwhile, the driver circuit DRV2 may control its start pulse output terminal to be floating (i.e., high impedance) when it is disabled.

Figure 8B:
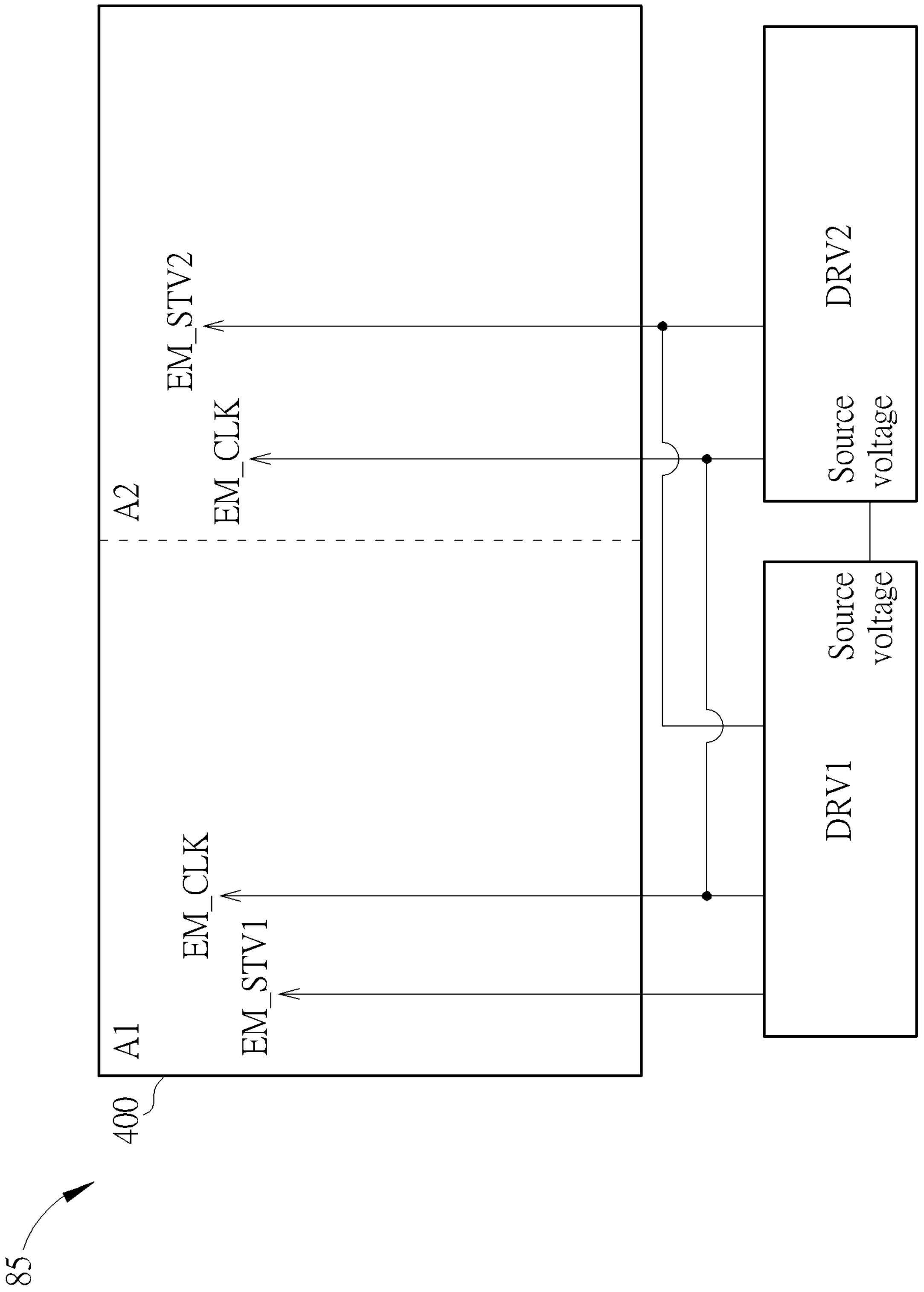

FIG. 8B illustrates another display system 85 according to an embodiment of the present invention. As shown in FIG. 8B, the display system 85 is similar to the display 80, except that the driver circuits DRV1 and DRV2 in the display system 85 commonly output the emission control clock EM_CLK to the areas A1 and A2; that is, the clock output terminal of the driver circuit DRV1 and the clock output terminal of the driver circuit DRV2 are coupled to each other, to output the same emission control clock EM_CLK to control the areas A1 and A2.

Figure 9A:
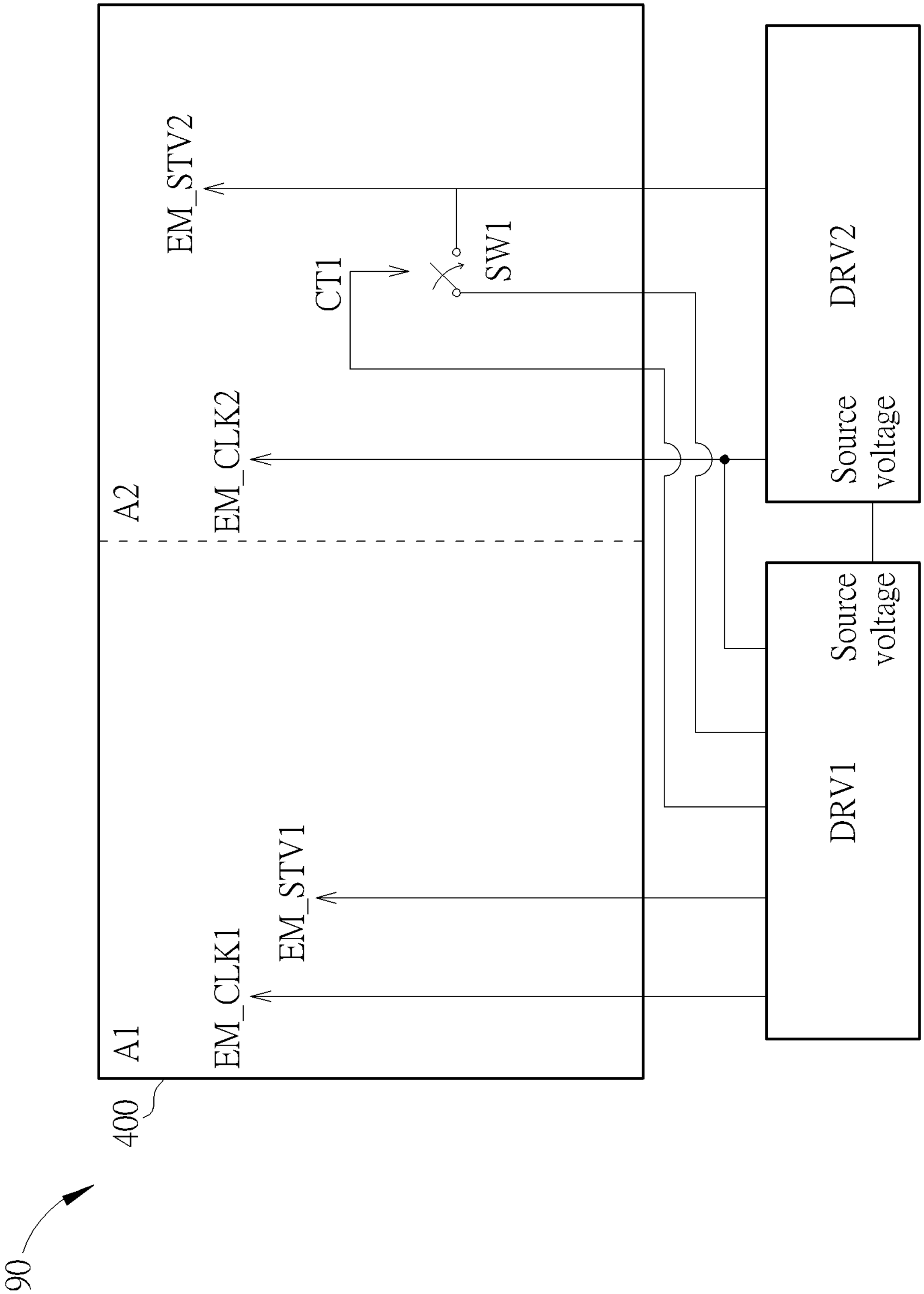

Please refer to FIG. 9A, which is a schematic diagram of a display system 90 according to an embodiment of the present invention. As shown in FIG. 9A, the structure of the display system 90 is similar to the structure of the display system 80, so signals and elements having similar functions are denoted by the same symbols. The difference between the display system 90 and the display system 80 is that, in the display system 90, an additional switch SW1 is included for controlling the signal source of the emission start pulse EM_STV2 for the area A2 of the OLED panel 400. The switch SW1 may be coupled to the start pulse output terminal of the driver circuit DRV1 outputting the emission start pulse EM_STV2, and may be controlled by the driver circuit DRV1 (e.g., through a control signal CT1).

Please note that FIG. 9A shows that the switch SW1 is deployed on the panel. In another embodiment, the switch SW1 may be deployed on the circuit board carrying the driver circuits DRV1 and/or DRV2, or implemented in any possible manner.

In the normal operation mode, the driver circuits DRV1 and DRV2 may provide the emission start pulses EM_STV1 and EM_STV2 for the corresponding areas A1 and A2, respectively. At this moment, the driver circuit DRV1 may turn off the switch SW1 through the control signal CT1, and the emission start pulse EM_STV2 for the area A2 is provided from the driver circuit DRV2. In the power saving mode, when the driver circuit DRV2 is disabled, the driver circuit DRV1 may turn on the switch SW1 through the control signal CT1, so that the driver circuit DRV1 can provide the emission start pulse EM_STV2 for the area A2. In an embodiment, the driver circuit DRV1 may output a high voltage as the emission start pulse EM_STV2, so as to scan black on the panel.

Figure 9B:
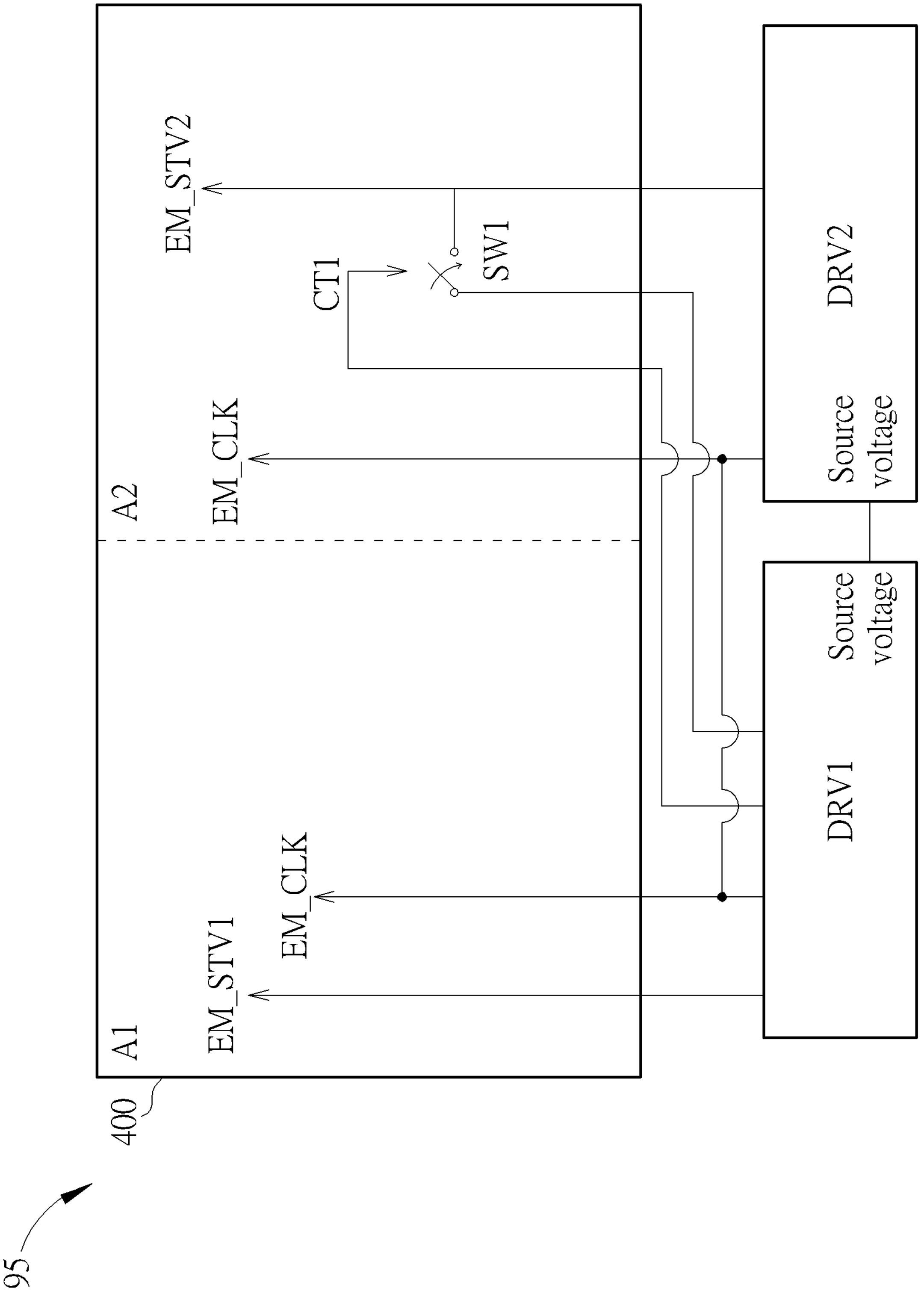

FIG. 9B illustrates another display system 95 according to an embodiment of the present invention. As shown in FIG. 9B, display system 95 is similar to the display system 90, except that the driver circuits DRV1 and DRV2 in the display system 95 commonly output the emission control clock EM_CLK to the areas A1 and A2; that is, the clock output terminal of the driver circuit DRV1 and the clock output terminal of the driver circuit DRV2 are coupled to each other, to output the same emission control clock EM_CLK to control the areas A1 and A2.

Figure 10:
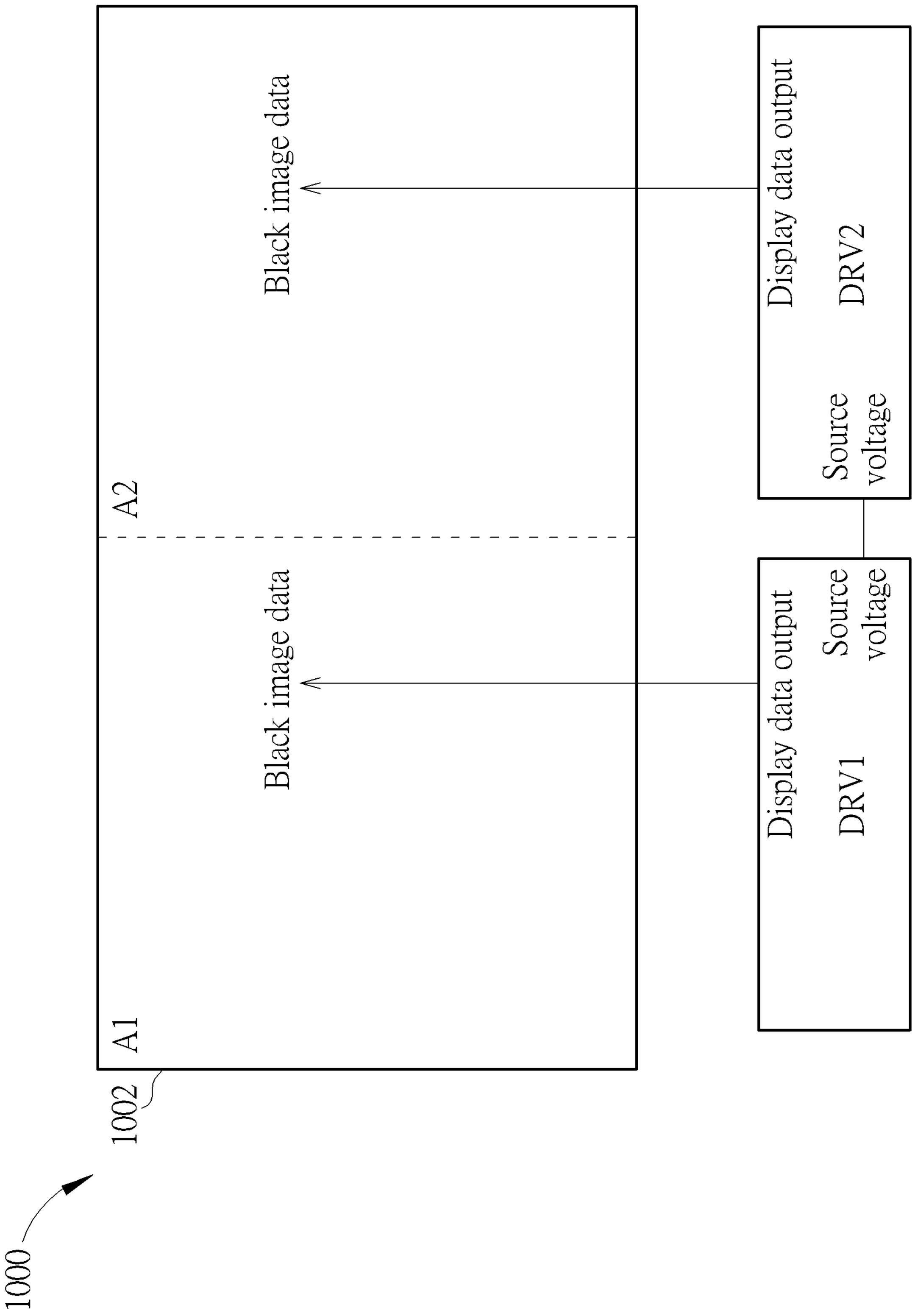

Please refer to FIG. 10, which is a schematic diagram of another display system 1000 according to an embodiment of the present invention. As shown in FIG. 10, in the display system 1000, the driver circuit DRV1 is configured to provide display data for the area A1 of the OLED panel 1002, and the driver circuit DRV2 is configured to provide display data for the area A2 of the OLED panel 1002. In the normal display mode, both the driver circuits DRV1 and DRV2 may output normal display data to the corresponding area on the OLED panel 1002. In the power saving mode, when the driver circuit DRV2 is disabled, the driver circuit DRV2 may output a specific voltage level such as black image data to the OLED panel 1002, to control the OLED panel 1002 to show a black image.

In this embodiment, the emission control signals such as the emission control clock and the emission start pulse for each area may be provided in any manner, e.g., received from any of the driver circuits DRV1 and DRV2. As long as the black image data is received by the panel, the emission control signals may be received in any manner. As a result, even if the emission functions of the OLED pixels are not turned off by the emission control signals, the panel may still show a black image without lighting on abnormally since the source data voltages are maintained at a specific voltage level corresponding to the black image. In an embodiment, the black image data may be the maximum data voltage corresponding to a maximum grayscale, which generates a black image on the panel.

As explained in FIGS. 1A and 1B and related paragraphs, the structure of the OLED panel has two types. The first type is that the emission control lines and scan lines of different areas are independent, and the second type is that the emission control lines and scan lines of different areas are connected to each other. The above embodiments of FIGS. 4-9 should be implemented with the first type of structure in which the emission control lines of each area are independent. This is because different areas may apply different emission control methods. If the emission control lines of different areas are connected, these embodiments will not work properly. The second type of structure may be implemented with the method as shown in FIG. 10, to display the black image by controlling the display data voltages. When the driver circuit DRV2 is disabled, it may continuously output the black image data to the panel, or output a specific voltage level that may ensure the panel to keep the black screen.

Please note that the present invention aims at providing various control schemes for a display system controlled by multiple driver circuits, where one or partial driver circuits are allowed to be disabled in the power saving mode. Those skilled in the art may make modifications and alterations accordingly. For example, in the above embodiments, the driver circuit DRV1 outputs the emission control signals to control the area A2 which receives display data from the driver circuit DRV2, and the driver circuit DRV2 is disabled in the power saving mode. In another embodiment, the driver circuit DRV2 may be configured to output the emission control signals to control the area A1 driven by the driver circuit DRV1, and the driver circuit DRV1 may be disabled while the driver circuit DRV2 remains active in the power saving mode.

In addition, in the embodiment as shown in FIG. 4C, the source voltage terminals for the source voltages VGH, VGL and AVEE of the supply voltages VGHO, VGLO and Vini are connected between different driver circuits, allowing the regulators to maintain a normal bias status when partial driver circuits are disabled in the power saving mode, so as to avoid power leakage. This implementation is also applicable to any of the embodiments shown in FIGS. 5-10. In other words, no matter how the driver circuits output the emission control signals to the panel, the front-end source voltage terminals of the supply voltages VGHO, VGLO and Vini should be connected between the driver circuits, so as to prevent the possible power leakage problem in the power saving mode.

In the embodiments of the present invention, each driver circuit may be a driver IC. The driver IC may be cascaded to forward the display data and perform synchronization. In addition, although there is no particular description, in the above embodiments of FIGS. 4-9, the emission control signals of the driver circuits may be output to the GOA circuit deployed in the non-active area of the panel. For example, the emission control signals for the left area A1 are output to the GOA circuit on the left-hand side, and the emission control signals for the right area A2 are output to the GOA circuit on the right-hand side. Alternatively, a gate driver IC may be applied instead of the GOA structure, where the gate driver IC may be a stand-alone IC or integrated with the driver circuit in the same IC.

Further, in the above embodiments, the driver circuits are configured to drive an OLED panel. In fact, the embodiments of the present invention are applicable to any type of display panel requiring emission control by receiving emission control signals from the driver circuits.

Figure 11:
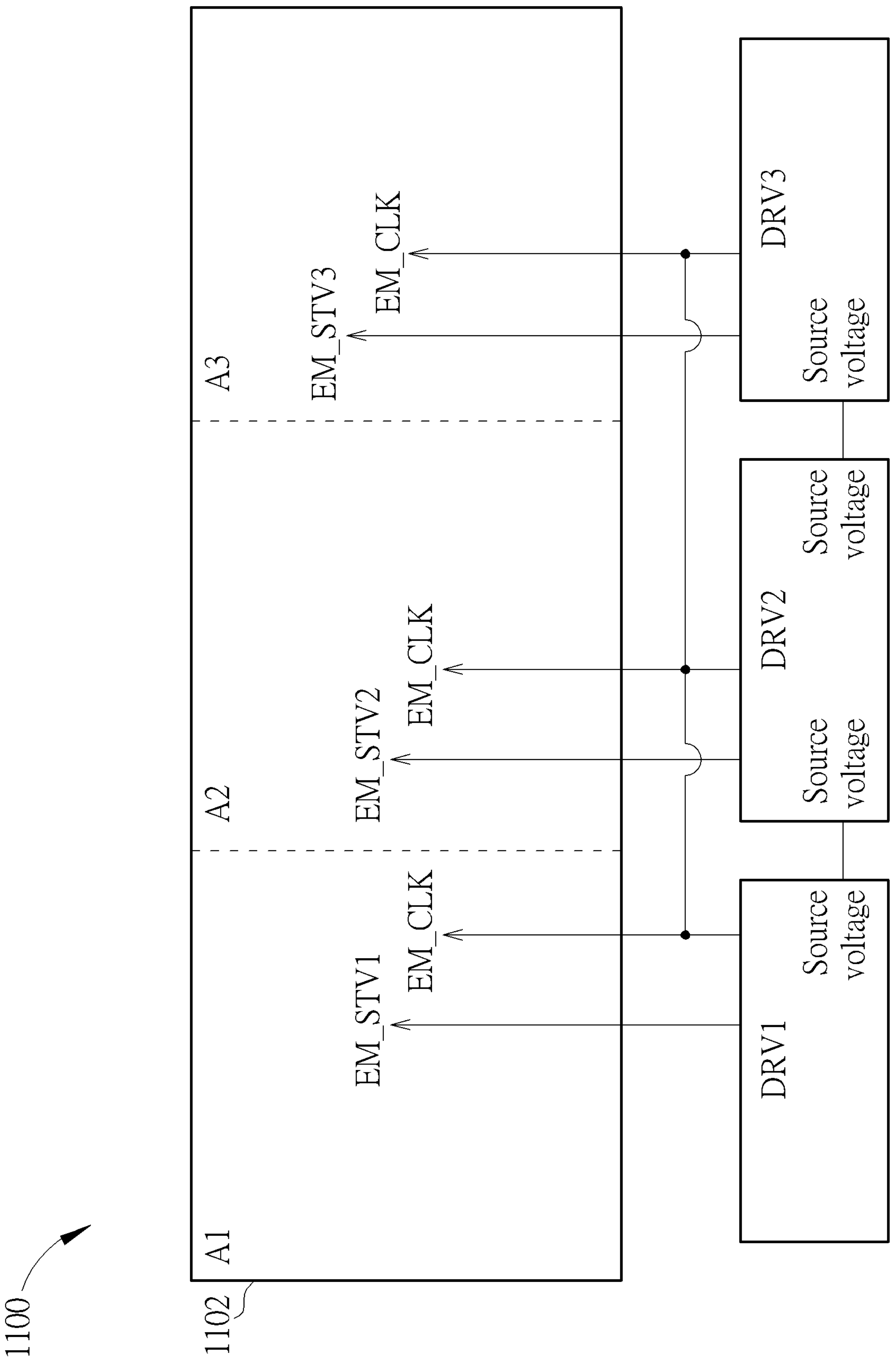

Please refer to FIG. 11, which is a schematic diagram of a display system 1100 according to an embodiment of the present invention. As shown in FIG. 11, the display system 1100 includes an OLED panel 1102, which is partitioned into three areas A1-A3, and the areas A1-A3 are controlled by the driver circuits DRV1-DRV3, respectively. In this embodiment, the driver circuits DRV1-DRV3 may commonly output an emission control clock EM_CLK to each area A1-A3 of the OLED panel 1102. When one or two of the driver circuits DRV1-DRV3 are disabled in the power saving mode, other driver circuit(s) may still output the emission control clock EM_CLK. Similarly, the output terminal of the emission start pulses EM_STV1-EM_STV3 may be kept high to disable the emission functions of the OLED panel 1102 in the power saving mode, so as to avoid abnormal light emission.

As can be seen, various embodiments of the present invention as described above may be applicable to a panel having more partitions, where the panel may be divided into N areas (N may be any integer greater than 2), which are controlled by N driver circuits, respectively. In the power saving mode, any one or more of these driver circuits may be selectively disabled, and the black screen may be maintained through well control of the emission control clocks and the emission start pulses.

Figure 12:
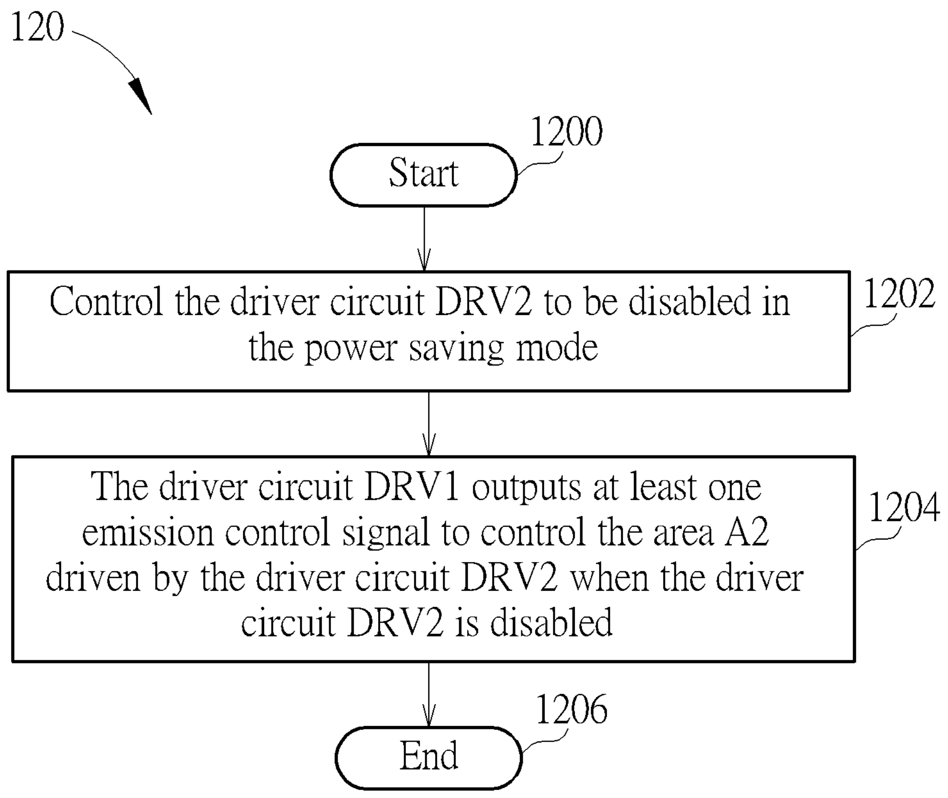
FIG. 12 is a flowchart of a control process according to an embodiment of the present invention.

The abovementioned methods of controlling the display panel partitioned into multiple areas and controlled by multiple driver circuits may be summarized into a control process 120, as shown in FIG. 12. For example, the control process 120 may be applied to a display panel partitioned into at least two areas A1 and A2, which are driven by and receive display data from at least two driver circuits DRV1 and DRV2, respectively. The control process 120 includes the following steps:

Step 1200: Start.

Step 1202: Control the driver circuit DRV2 to be disabled in the power saving mode.

Step 1204: The driver circuit DRV1 outputs at least one emission control signal to control the area A2 driven by the driver circuit DRV2 when the driver circuit DRV2 is disabled.

Step 1206: End.

The detailed implementations and operations of the control process 120 are illustrated in the above descriptions, and will not be narrated hereinafter.

To sum up, the present invention provides an OLED panel which is partitioned into multiple areas to be controlled by multiple driver circuits, where one or several of the driver circuits may be disabled to achieve the power saving effect and keep a black screen on the panel. In the power saving mode, a first driver circuit may provide emission control signal(s) such as an emission control clock and/or an emission start pulse for the area of the panel driven by a second driver circuit. Therefore, when the second driver circuit is disabled, the first driver circuit may still output the emission control signals to control this area, e.g., to pull the emission control signals to a specific voltage level to keep the black screen and prevent abnormal emission on the panel in the power saving mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a first driver circuit, which is configured to cooperate with a second driver circuit to control a display panel, the first driver circuit being configured to output display data to a first area of the display panel and the second driver circuit being configured to output display data to a second area of the display panel, the display panel having a first gate-on-array (GOA) circuit and a second GOA circuit, wherein the first GOA circuit corresponds to the first area and the second GOA circuit corresponds to the second area, the method comprising:

outputting, by the first driver circuit, at least one emission control signal to the second GOA circuit, to control a light-emitting device in the second area of the display panel to stop emitting light when the second driver circuit is disabled;

wherein the at least one emission control signal comprises an emission start pulse and an emission control clock.

2. The method of claim 1, further comprising:

outputting a first emission control clock to control the first area of the display panel; and outputting a second emission control clock to control the second area of the display panel.

3. The method of claim 2, wherein the second driver circuit is configured to output the second emission control clock to control the second area of the display panel with the first driver circuit in common.

4. The method of claim 1, further comprising:

outputting the emission control clock to control the first area and the second area of the display panel.

5. The method of claim 4, wherein the second driver circuit is configured to output the emission control clock to control the first area and the second area of the display panel with the first driver circuit in common.

6. The method of claim 1, further comprising:

outputting the emission start pulse to the second area of the display panel no matter whether the second driver circuit is disabled or enabled.

7. The method of claim 1, wherein the second driver circuit is configured to pull an output terminal of the emission start pulse to a high level when the second driver circuit is disabled.

8. The method of claim 1, further comprising:

outputting a first emission start pulse to control the first area of the display panel; and outputting a second emission start pulse to control the second area of the display panel.

9. The method of claim 8, wherein the first driver circuit is configured to output the second emission start pulse to control the second area of the display panel when the second driver circuit is disabled, and the second driver circuit is configured to output a third emission start pulse to control the second area of the display panel when the second driver circuit is enabled.

10. The method of claim 8, wherein the display panel comprises a switch coupled to an output terminal of the first driver circuit outputting the second emission start pulse.

11. The method of claim 10, further comprising:

outputting a control signal to turn on the switch when the second driver circuit is disabled.

12. The method of claim 1, wherein the first driver circuit and the second driver circuit are configured to output a supply voltage to the display panel, and a first voltage source terminal corresponding to the supply voltage of the first driver circuit is coupled to a second voltage source terminal corresponding to the supply voltage of the second driver circuit.

13. The method of claim 1, wherein the first driver circuit is enabled when the second driver circuit is disabled.

14. The method of claim 1, wherein the display panel is an organic light-emitting diode (OLED) panel, and the at least one emission control signal is configured to control emission of OLEDs on the OLED panel.

15. A method for a display system, the display system comprising a display panel commonly controlled by a plurality of driver circuits, the display panel having a first gate-on-array (GOA) circuit and a second GOA circuit, wherein the first GOA circuit corresponds to a first area of the display panel and the second GOA circuit corresponds to a second area of the display panel, the method comprising:

controlling a second driver circuit among the plurality of driver circuits to be disabled and in a power saving status; and outputting, by a first driver circuit among the plurality of driver circuits, at least one emission control signal to the second GOA circuit, to control a light-emitting device in the second area of the display panel to stop emitting light when the second driver circuit is disabled and in the power saving status;

wherein the first area is configured to receive display data from the first driver circuit and the second area is configured to receive display data from the second driver circuit;

wherein the at least one emission control signal comprises an emission start pulse and an emission control clock.

* * * * *